US012803860B2

(12) United States Patent
Wang

(10) Patent No.: US 12,803,860 B2
(45) Date of Patent: Nov. 17, 2026

(54) NODE CONSENSUS METHOD, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Neng Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 5 days.

(21) Appl. No.: 19/197,272

(22) Filed: May 2, 2025

(65) Prior Publication Data

US 2025/0267056 A1 Aug. 21, 2025

Related U.S. Application Data

(63) Continuation of application No. PCT/CN2023/132503, filed on Nov. 20, 2023.

(30) Foreign Application Priority Data

Apr. 20, 2023 (CN) ........................ 202310458586.5

(51) Int. Cl.
*H04L 41/06* (2022.01)
*H04L 9/00* (2022.01)
*H04L 41/0866* (2022.01)

(52) U.S. Cl.
CPC ................ *H04L 41/06* (2013.01); *H04L 9/50* (2022.05); *H04L 41/0866* (2013.01)

(58) Field of Classification Search
CPC ....... H04L 41/06; H04L 9/50; H04L 41/0866; H04L 63/14; H04L 41/30;
(Continued)

(56) References Cited

U.S. PATENT DOCUMENTS

2019/0068380 A1* 2/2019 Tang ..................... A61M 5/172
2020/0117657 A1* 4/2020 Xie ........................ G06Q 20/02
(Continued)

FOREIGN PATENT DOCUMENTS

CN 110012100 A 7/2019
CN 110708163 A 1/2020
(Continued)

OTHER PUBLICATIONS

The World Intellectual Property Organization (WIPO) International Search Report for PCT/CN2023/132503 Feb. 21, 2024 5 Pages (including translation).

(Continued)

*Primary Examiner* — Johnny B Aguiar
(74) *Attorney, Agent, or Firm* — ANOVA LAW GROUP, PLLC

(57) ABSTRACT

A node consensus method includes selecting, an abnormal node meeting a set node anomaly condition from a plurality of the consensus nodes in response to a target proposal being obtained and a locally recorded total number of proposal generations reaching a total number threshold; transmitting a first vote in a prevote stage to other consensus nodes and receiving one or more first votes in the prevote stage that are transmitted by the other consensus nodes, the first vote transmitted by a first consensus node carrying a node identifier of the abnormal node; transmitting a second vote in a precommit stage to the other consensus nodes, and receiving one or more second votes in the precommit stage that are transmitted by the other consensus nodes; and determining that a consensus is reached on the target proposal and deleting the abnormal node from the plurality of consensus nodes.

20 Claims, 13 Drawing Sheets

(58) Field of Classification Search
CPC ........... H04L 2209/463; H04L 67/1095; H04L 41/0659; G06F 11/1474; G06F 11/182; G06F 11/187; G06F 11/20; G06F 16/2379; G06F 16/27
See application file for complete search history.

(56) References Cited

U.S. PATENT DOCUMENTS

| | | | | |
|---|---|---|---|---|
| 2020/0293516 | A1* | 9/2020 | Xie | H04L 9/3239 |
| 2021/0058486 | A1* | 2/2021 | Chen | H04L 9/0637 |
| 2021/0314216 | A1* | 10/2021 | Liao | G06F 21/64 |
| 2023/0273912 | A1* | 8/2023 | Liu | G06F 16/2315 |

FOREIGN PATENT DOCUMENTS

| | | | |
|---|---|---|---|
| CN | 111654395 | A | 9/2020 |
| CN | 112232954 | A | 1/2021 |
| WO | 2017123649 | A1 | 7/2017 |

OTHER PUBLICATIONS

The European Patent Office (EPO) The Extended European Search Report for Application No. 23933825.4 Feb. 13, 2026 6 Pages.

* cited by examiner

NODE CONSENSUS METHOD, ELECTRONIC DEVICE, AND STORAGE MEDIUM

CROSS-REFERENCES TO RELATED APPLICATIONS

This application is a continuation application of PCT Patent Application No. PCT/CN2023/132503, filed on Nov. 20, 2023, which claims priority to Chinese Patent Application No. 202310458586.5, filed on Apr. 20, 2023, all of which is incorporated by reference in their entirety.

FIELD OF THE TECHNOLOGY

The present disclosure relates to the field of computer technologies and, in particular, a node consensus method and apparatus, an electronic device, a storage medium, and a program product.

BACKGROUND OF THE DISCLOSURE

Distributed systems are a computing system that is widely used at present, which are applied to various fields such as blockchains and ZooKeeper distributed service frameworks. During operations of the distributed systems, a consensus needs to be formed on pending messages from client devices. Consensus mainly includes three stages: a proposal stage, a prevote stage, and a precommit stage. Taking four consensus nodes as an example (which may include a master node and three slave nodes), a consensus process is as follows.

After receiving a consensus request from a client device, the master node generates a proposal, and then broadcasts the proposal to each slave node. After receiving the proposal, each slave node enters a prevote stage, generates a prevote vote (if the slave node does not receive a proposal within duration of a timer, the salve node generates a prevote vote for a null proposal) in the prevote stage, and broadcasts the prevote vote of the slave node to other nodes.

After receiving more than $\frac{2}{3}+1\approx 3$ prevote votes, each node enters a precommit stage, generates a precommit vote, and broadcasts the own precommit vote to other nodes. Each node enters a commit stage after receiving $\frac{2}{3}+1\approx 3$ precommit votes. In the commit stage, if the consensus proposal is a null proposal, the proposal will not be committed.

SUMMARY

One embodiment of the present disclosure provides a node consensus method applied to a first consensus node of a plurality of consensus nodes. The method includes selecting, based on numbers of proposal generations corresponding to the plurality of consensus nodes in a distributed system that are locally recorded, an abnormal node meeting a set node anomaly condition from the plurality of consensus nodes in response to a target proposal being obtained and a locally recorded total number of proposal generations reaching a total number threshold; transmitting a first vote in a prevote stage to other consensus nodes among the plurality of consensus nodes except the first consensus node, and receiving one or more first votes in the prevote stage that are transmitted by the other consensus nodes, the first vote transmitted by the first consensus node carrying a node identifier of the abnormal node; transmitting a second vote in a precommit stage to the other consensus nodes, and receiving one or more second votes in the precommit stage that are transmitted by the other consensus nodes, in response to a number of first votes carrying the node identifier of the abnormal node in the received one or more first votes reaching a first vote number threshold, and the second vote transmitted by the first consensus node carrying the node identifier of the abnormal node; and determining that a consensus is reached on the target proposal, and deleting the abnormal node from the plurality of consensus nodes that are locally recorded, in response to a number of second votes carrying the node identifier of the abnormal node in the received one or more second votes reaching a second vote number threshold.

Another embodiment of the present disclosure provides an electronic device, including one or more processors and a memory containing a computer program that, when being executed, causes the one or more processors to perform: selecting, based on numbers of proposal generations corresponding to a plurality of consensus nodes in a distributed system that are locally recorded, an abnormal node meeting a set node anomaly condition from the plurality of consensus nodes in response to a target proposal being obtained and a locally recorded total number of proposal generations reaching a total number threshold; transmitting a first vote in a prevote stage to other consensus nodes among the plurality of consensus nodes except the first consensus node, and receiving one or more first votes in the prevote stage that are transmitted by the other consensus nodes, the first vote transmitted by a first consensus node, of the plurality consensus nodes, carrying a node identifier of the abnormal node; transmitting a second vote in a precommit stage to the other consensus nodes, and receiving one or more second votes in the precommit stage that are transmitted by the other consensus nodes, in response to a number of first votes carrying the node identifier of the abnormal node in the received one or more first votes reaching a first vote number threshold, and the second vote transmitted by the first consensus node carrying the node identifier of the abnormal node; and determining that a consensus is reached on the target proposal, and deleting the abnormal node from the plurality of consensus nodes that are locally recorded, in response to a number of second votes carrying the node identifier of the abnormal node in the received one or more second votes reaching a second vote number threshold.

Another embodiment of the present disclosure provides a non-transitory computer-readable storage medium containing a computer program that, when being executed, causes at least one processor to perform: selecting, based on numbers of proposal generations corresponding to a plurality of consensus nodes in a distributed system that are locally recorded, an abnormal node meeting a set node anomaly condition from the plurality of consensus nodes in response to a target proposal being obtained and a locally recorded total number of proposal generations reaching a total number threshold; transmitting a first vote in a prevote stage to other consensus nodes among the plurality of consensus nodes except the first consensus node, and receiving one or more first votes in the prevote stage that are transmitted by the other consensus nodes, the first vote transmitted by a first consensus node, of the plurality consensus nodes, carrying a node identifier of the abnormal node; transmitting a second vote in a precommit stage to the other consensus nodes, and receiving one or more second votes in the precommit stage that are transmitted by the other consensus nodes, in response to a number of first votes carrying the node identifier of the abnormal node in the received one or more first votes reaching a first vote number threshold, and the second vote transmitted by the first consensus node carrying the node identifier of the abnormal node; and determining that a consensus is reached on the target proposal, and deleting the abnormal node from the plurality of consensus nodes that are locally recorded, in response to a number of second votes carrying the node identifier of the abnormal node in the received one or more second votes reaching a second vote number threshold.

Other features and advantages of the present disclosure are set forth in the subsequent specification, and in part become clear from the specification, or are learned by implementing the present disclosure. The objectives and other advantages of the present disclosure may be realized and attained by the structure particularly pointed out in the written specification, claims, and the accompanying drawings.

BRIEF DESCRIPTION OF THE DRAWINGS

The accompanying drawings described herein are used to provide a further understanding of the present disclosure, and form part of the present disclosure. Exemplary embodiments of the present disclosure and descriptions thereof are used for explaining the present disclosure, and do not constitute any inappropriate limitation on the present disclosure. In the drawings.

DESCRIPTION OF EMBODIMENTS

Figure 1:
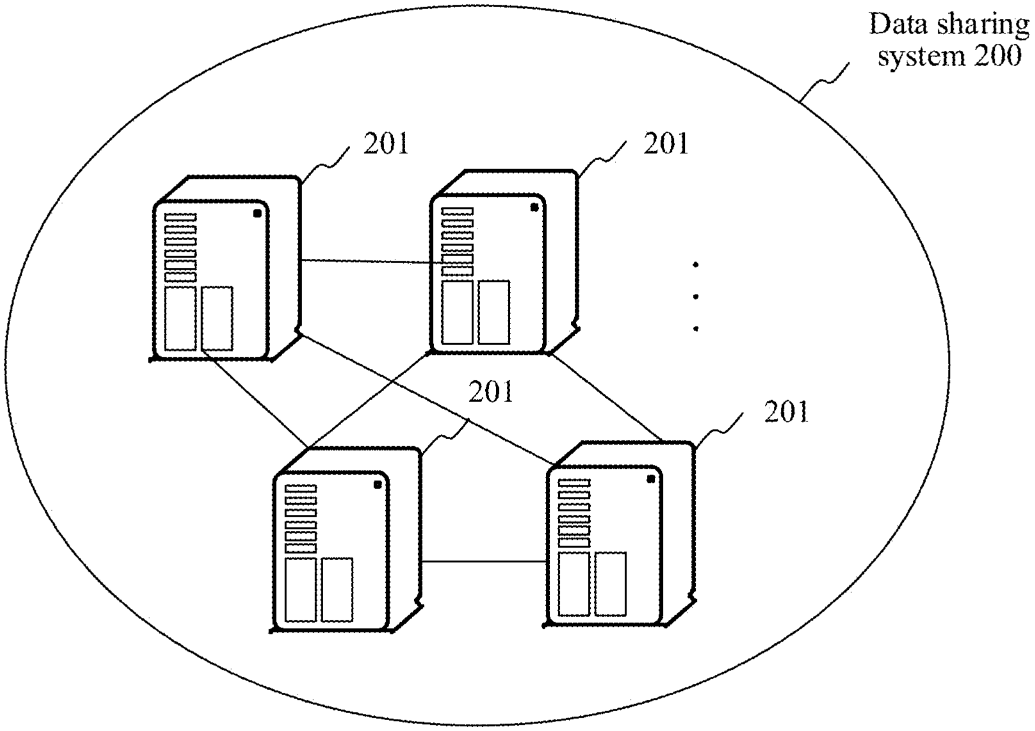
FIG. 1 is a schematic structural diagram of a data sharing system according to an embodiment of the present disclosure.

To make the objective, technical solutions and advantages of embodiments of the present disclosure clearer, the technical solutions in the present disclosure are described below with reference to the accompanying drawings in the embodiments of the present disclosure. Clearly, the described embodiments are some but not all of the embodiments of technical solutions of the present disclosure. All other embodiments obtained by a person of ordinary skill in the art based on the embodiments described in files of the present disclosure without creative efforts fall within the protection scope of technical solutions of the present disclosure.

The terms "first", "second", and the like in the embodiments of the present disclosure are used for distinguishing between different objects, not for describing a specific order. In addition, the terms "comprise/include" and "have" and any variations thereof are intended to cover a non-exclusive inclusion. For example, a process, method, system, product, or device that includes a series of operations or modules is not limited to the listed operations or modules, but exemplarily further includes operations or modules that are not listed, or exemplarily further includes other operations or modules that are inherent to these processes, methods, products, or devices.

"A plurality of" in the present disclosure may mean at least two, and may be, for example, two, three, or more. This is not limited according to the embodiments of the present disclosure. "And/or" is a description of the associated relationship of associated objects, representing that three relationships may exist. For example, A and/or B may be expressed as three instances: A exists alone, A and B coexist, or B exists alone. The character "/" generally indicates an "or" relationship between associated objects.

Embodiments of the present disclosure provide a node consensus method and apparatus, to improve consensus efficiency and improve performance of a distributed system.

A consensus may have three stages: a proposal stage, a prevote stage, and a precommit stage (different Byzantine algorithms may have different names, but core processing procedures thereof are all the three stages). Using four consensus nodes as an example (which may include a master node and three slave nodes), a consensus process is as follows.

After receiving a consensus request from a client device, the master node generates a proposal, and then broadcasts the proposal to each slave node. After receiving the proposal, each slave node enters a prevote stage, generates a prevote vote (a prevote vote for a null proposal is generated if the slave node receives no proposal within duration of a timer) in the prevote stage, and broadcasts the prevote vote of the slave node to other nodes.

After receiving 3 prevote votes, each node enters a precommit stage, generates a precommit vote, and broadcasts the precommit vote of the node to other nodes.

Each node enters a commit stage after receiving 3 precommit votes. In the commit stage, if a proposal on which a consensus is reached is a null proposal, the proposal is not committed.

To ensure fairness and security, each time a consensus is completed, a node is usually switched to become a master node. However, if there is a faulty node among consensus nodes, when the faulty node becomes a master node, the faulty node cannot generate a proposal and cannot transmit the proposal to other nodes for a consensus. Consequently, the other nodes need to cast null votes upon overtime of a timer to reach a null consensus, and then a normal node is switched to become a master node. The normal node generates a proposal and reaches a consensus. Clearly, when there is a faulty node in a distributed system, performance of the distributed system is significantly degraded.

In embodiments of the present disclosure, when one of a plurality of consensus nodes in a distributed system obtains a target proposal and a total number of proposal generations that is locally recorded by the consensus node reaches a total number threshold, an abnormal node is selected from the plurality of consensus nodes based on numbers of proposal generations respectively corresponding to the plurality of consensus nodes locally recorded by the consensus node. Then the consensus node carries a node identifier of the abnormal node in a first vote in a prevote stage of the consensus node, and broadcasts the first vote of the consensus node to other consensus nodes among the plurality of consensus nodes except the consensus node. In addition, the consensus node further receives first votes transmitted by the other consensus nodes in the prevote stage. When a number of the received first votes carrying the node identifier of the abnormal node reaches a first vote number threshold, the consensus node broadcasts a second vote in a precommit stage that carries the node identifier of the abnormal node, and receives second votes in the precommit stage that are transmitted by the other consensus nodes. Then the consensus node determines that a consensus is reached on the target proposal, and deletes the abnormal node from the plurality of consensus nodes locally recorded by the consensus node, when a number of the received second votes carrying the node identifier of the abnormal node reaches a second vote number threshold. In this way, the consensus node in the distributed system analyzes a historical proposal record, so that the node identifier of the abnormal node is attached to the first vote and the second vote, and it is finally ensured through security guarantee by a Byzantine consensus protocol that all nodes unanimously remove the abnormal node from a consensus node list. Therefore, an entire consensus network can safely and correctly delete the abnormal node when encountering node failure, and it is finally ensured to a maximum extent that all nodes participating in a consensus are normal nodes, thereby greatly improving performance of an entire blockchain network.

FIG. 1 is a schematic structural diagram of a data sharing system according to an embodiment of the present disclosure. The data sharing system 200 refers to a system for data sharing between nodes. The data sharing system may include a plurality of nodes 201, and the plurality of nodes 201 may refer to, for example, client devices in the data sharing system. During normal operation, each node 201 may receive input information, and maintain shared data in the data sharing system based on the received input information. To ensure information exchange in the data sharing system, an information connection may exist between nodes in the data sharing system, and the nodes may transmit information by the information connection. For example, when any node in the data sharing system receives input information, other nodes in the data sharing system obtain the input information based on a consensus algorithm, and store the input information as data in shared data, so that data stored on all nodes in the data sharing system is consistent.

Each node in the data sharing system has a corresponding node identifier, and each node in the data sharing system may store node identifiers of other nodes in the data sharing system, so as to subsequently broadcast a generated block to the other nodes in the data sharing system based on the node identifiers of the other nodes. Each node may maintain a node identifier list shown in the following table, and node names and node identifiers are correspondingly stored in the node identifier list. The node identifier may be an Internet protocol (IP) address and any other information that can be used for identifying a node. Only an IP address is used as an example in Table 1 for description.

TABLE 1

Node identifier list

| Node name | Node identifier |
|---|---|
| Node 1 | 117.114.151.174 |
| Node 2 | 117.116.189.145 |
| . . . | . . . |
| Node N | 119.123.789.258 |

Figure 2A:
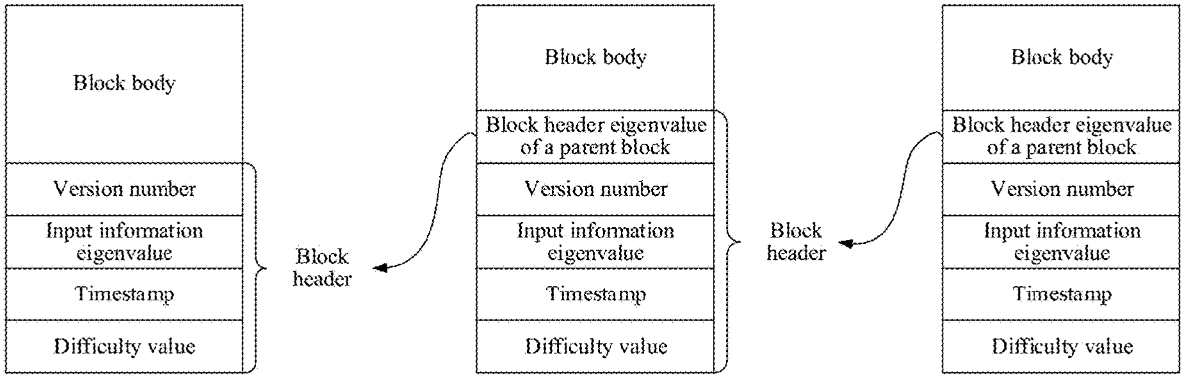
FIG. 2A is a schematic structural diagram of a blockchain according to an embodiment of the present disclosure.

Each node in the data sharing system stores the same blockchain. FIG. 2A is a schematic structural diagram of a blockchain according to an embodiment of the present disclosure. Referring to FIG. 2A, the blockchain includes a plurality of blocks. An earliest constructed block in the blockchain is referred to as a Genesis block. The Genesis block includes a block header and a block body. The block header stores an input information eigenvalue, a version number, a timestamp, and a difficulty value, and the block body stores input information. A next block of the Genesis block uses the Genesis block as a parent block. The next block also includes a block header and a block body. The block header stores an input information eigenvalue of the current block, a block header eigenvalue of the parent block, a version number, a timestamp, and a difficulty value. The rest can be deduced by analogy, so that block data stored in each block in the blockchain is associated with block data stored in the parent block, thereby ensuring security of input information in the block.

Figure 2B:
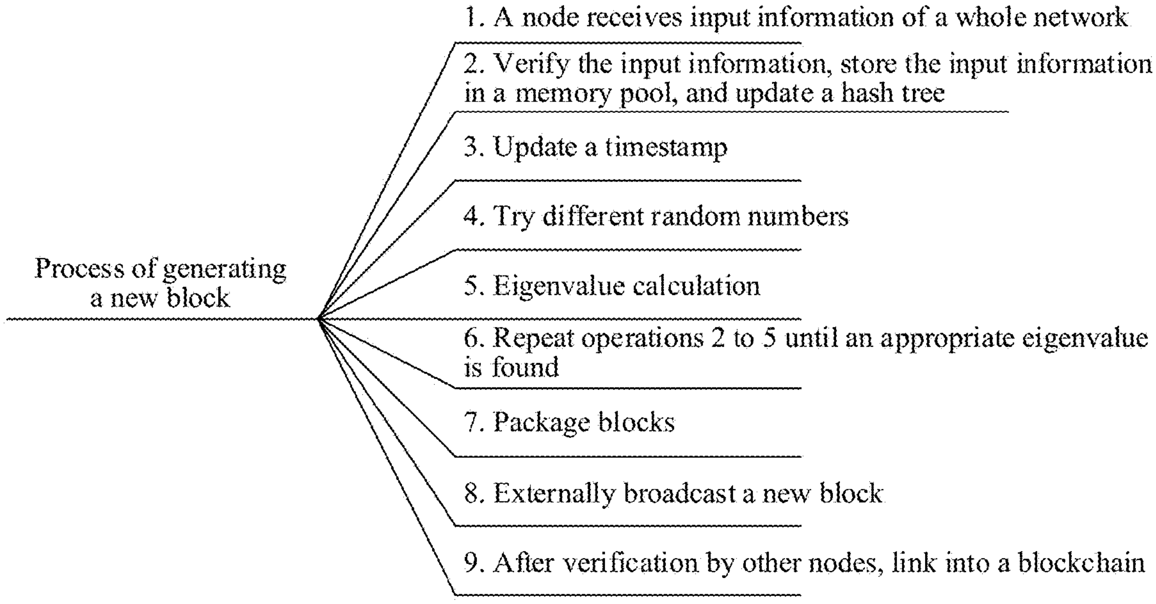
FIG. 2B is a schematic logic diagram of a block generation process according to an embodiment of the present disclosure.

FIG. 2B is a schematic logic diagram of a block generation process according to an embodiment of the present disclosure. Referring to FIG. 2B, when each block in the blockchain is generated, upon receiving input information of a whole network, a node (for example, a current node) on which the blockchain is located verifies the input information. After completing the verification, the node stores the input information to a memory pool, and updates a hash tree used by the node for recording the input information. Then, the current node updates the timestamp to a time when the input information is received, tries different random numbers, and calculates an eigenvalue for multiple times, so that the calculated eigenvalue may satisfy the following formula:

$$\mathrm{SHA256}(\mathrm{SHA256}(\mathrm{version}+\mathrm{prev\_hash}+\mathrm{merkle\_root}+n\mathrm{time}+n\mathrm{bits}+x))<\mathrm{TARGET}$$

where SHA256 is an eigenvalue algorithm used for calculating an eigenvalue; version (the version number) is version information of a relevant block protocol in a blockchain; prev_hash is a block header eigenvalue of a parent block of a current block; merkle_root is an eigenvalue of the input information; ntime is an update time of the timestamp; nbits is current difficulty, is a fixed value within a period of time, and is determined again after a fixed period of time; x is a random number; and TARGET is an eigenvalue threshold, and the eigenvalue threshold may be determined based on nbits.

In this way, when the random number (x) satisfying the foregoing formula is obtained through calculation, the input information may be correspondingly stored, and a block header and a block body are generated, to obtain the current block. Then, the current node transmits, based on node identifiers of other nodes in a data sharing system, the newly generated block to the other nodes in the data sharing system in which the current node is located. The other nodes verify the newly generated block, and add, after completing the verification, the newly generated block to a blockchain stored by the other nodes.

Figure 3:
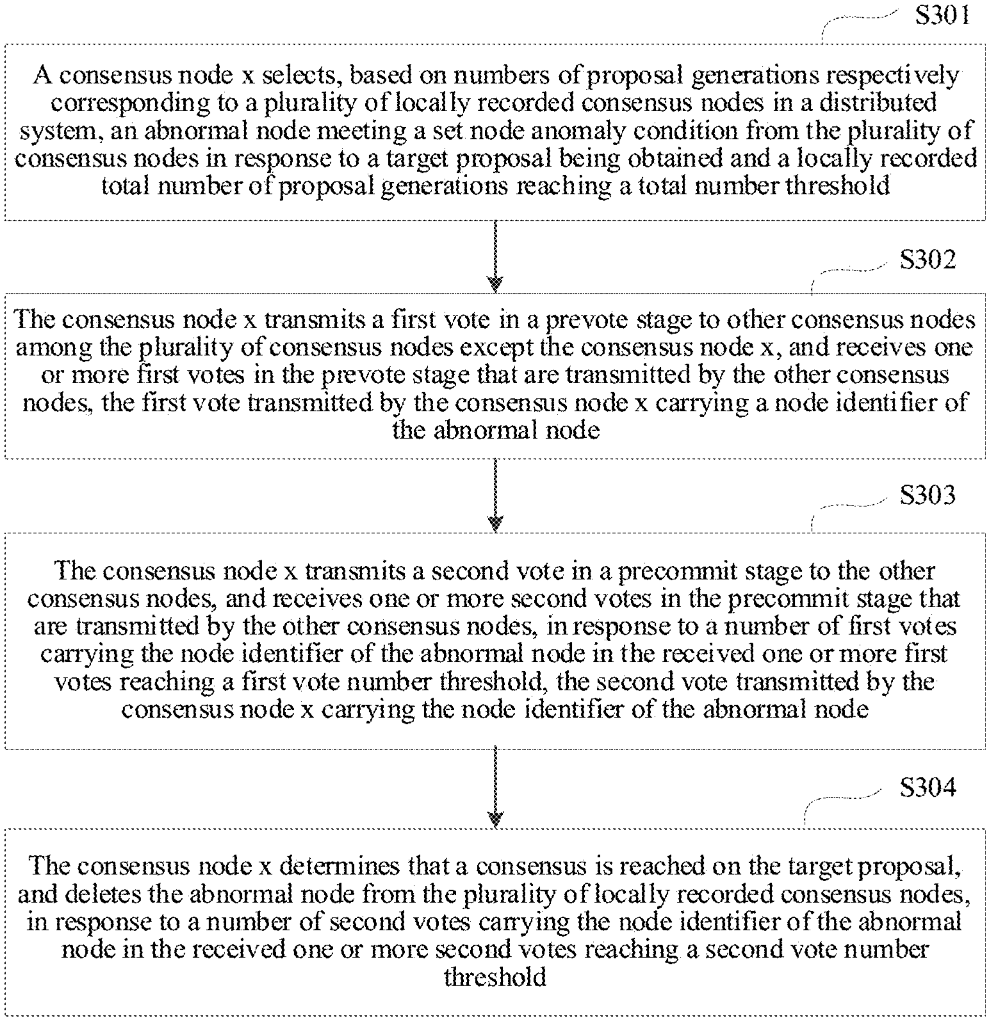
FIG. 3 is a schematic flowchart of a node consensus method according to an embodiment of the present disclosure.

FIG. 3 is a schematic flowchart of a node consensus method according to an embodiment of the present disclosure. The procedure is applied to a consensus node x. The consensus node x may be any one of a plurality of consensus nodes in a distributed system. The node consensus method includes the following specific operations:

S301: The consensus node x selects, based on numbers of proposal generations respectively corresponding to a plurality of locally recorded consensus nodes in a distributed system, an abnormal node meeting a set node anomaly condition from the plurality of consensus nodes when a target proposal is obtained and a locally recorded total number of proposal generations reaches a total number threshold. The plurality of consensus nodes include the consensus node x.

For example, before operation S301 is performed, during each round of consensus, if a plurality of consensus nodes reach a consensus on a non-null proposal generated by a master node, a number of proposal generations corresponding to the master node is accumulated, and a total number of proposal generations is updated. The master node is one of the plurality of consensus nodes.

That a plurality of consensus nodes reach a consensus on a non-null proposal generated by a master node may refer to, for example, that the plurality of consensus nodes reach, in a precommit stage, a consensus on a proposal generated by the master node, and the proposal is a non-null proposal, or may refer to that the plurality of consensus nodes reach, in a commit stage, a consensus on a proposal generated by the master node (if a proposal on which a consensus is reached in the precommit stage is a null proposal, the consensus nodes do not commit the null proposal).

The total number of proposal generations is a sum of numbers of proposal generations respectively corresponding to the plurality of consensus nodes.

A set value is accumulated to the number of proposal generations every time (each round of consensus). For example, during one round of consensus, if the plurality of consensus nodes reach a consensus on a non-null proposal generated by the master node, 1 is added to the number of proposal generations corresponding to the master node (a set value is 1). Correspondingly, 1 is added to the total number of proposal generations.

Figure 4:
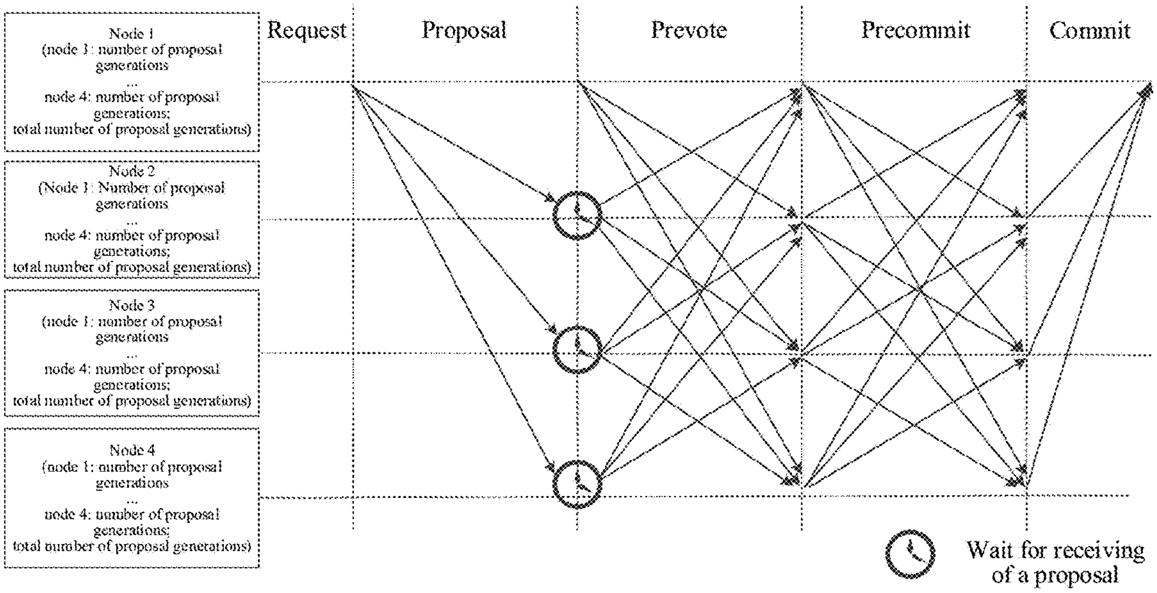
FIG. 4 is a schematic logic diagram of a node consensus process according to an embodiment of the present disclosure.

FIG. 4 is a schematic logic diagram of a node consensus process according to an embodiment of the present disclosure. Referring to FIG. 4, a node 1, a node 2, a node 3, and a node 4 are used as an example to describe a consensus process of the nodes. During one round of consensus process, the node 1 becomes a master node. After receiving a consensus request from a client device, the node 1 generates a proposal 1, broadcasts the proposal 1 to the node 2, the node 3, and the node 4, and enters a prevote stage. In the prevote stage, the node 1 generates a prevote vote, and broadcasts the prevote vote of the node to the node 2, the node 3, and the node 4. After receiving the proposal 1, each of the node 2, the node 3, and the node 4 enters a prevote stage, generates a prevote vote in the prevote stage, and broadcasts the prevote vote of the node to other nodes. After each of the node 1, the node 2, the node 3, and the node 4 receives $2\times4/3+1\approx3$ prevote votes, the node enters a precommit stage, generates a precommit vote, and broadcasts the precommit vote of the node to other nodes. Each of the node 1, the node 2, the node 3, and the node 4 enters a commit stage after receiving $2\times4/3+1\approx3$ precommit votes. In the commit stage, if the proposal 1 is not a null proposal, each of the node 1, the node 2, the node 3, and the node 4 commits the proposal. That is, the node 1, the node 2, the node 3, and the node 4 reach a consensus on the proposal 1. Therefore, 1 is added to a number of proposal generations that corresponds to the node 1 and that is recorded by each node, and a total number of proposal generations is updated by adding 1 thereto.

In one embodiment, the number of proposal generations corresponding to each consensus node and the total number of proposal generations corresponding to all the plurality of consensus nodes may be recorded in node proposal mapping information. That is, the node proposal mapping information is locally recorded. A node proposal mapping table includes: node identifiers of the plurality of consensus nodes and numbers of proposal generations corresponding to the plurality of consensus nodes.

Exemplarily, the node proposal mapping information is in a form of a key value pair. The node proposal mapping information may also be referred to as a node mapping map, where keys are node identifiers of the plurality of consensus nodes, and values are numbers of proposal generations corresponding to the consensus nodes. The number of proposal generations is a natural number, with an initial value being 0.

Each node identifier is used for uniquely identifying one consensus node. The node identifier may be represented by a serial number (ID), or may be represented by an Internet protocol (IP) address, but is not limited thereto.

Figure 5:
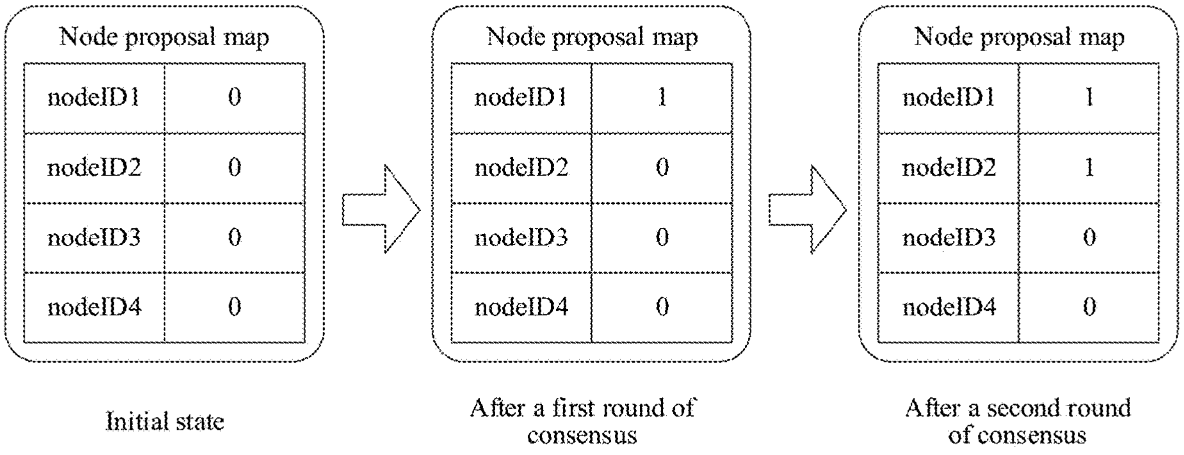
FIG. 5 is a schematic diagram of a node proposal map according to an embodiment of the present disclosure.

FIG. 5 is a schematic diagram of a node proposal map according to an embodiment of the present disclosure. For example, referring to FIG. 5, in a node mapping map, keys include node identifiers: nodeID1, nodeID2, nodeID3, and nodeID4, and values are numbers of proposal generations corresponding to consensus nodes corresponding to the node identifiers. For example, nodeID1 is a node identifier of a node 1, nodeID2 is a node identifier of a node 2, nodeID3 is a node identifier of a node 3, and nodeID4 is a node identifier of a node 4. It is assumed that an initial value of the value is 0. During a first round of consensus, when the consensus nodes reach a consensus on a non-null proposal generated by the node 1, and numbers of proposal generations corresponding to the node 1, the node 2, the node 3, and the node 4 are 1, 0, 0, and 0 respectively, the values are 1, 0, 0, and 0. During a second round of consensus, when the consensus nodes reach a consensus on a non-null proposal generated by the node 2, and numbers of proposal generations corresponding to the node 1, the node 2, the node 3, and the node 4 are 1, 1, 0, and 0, the values are 1, 1, 0, and 0.

In the embodiment of the present disclosure, the locally recorded total number of proposal generations may be determined in the following mode: numbers of proposal generations corresponding to the consensus nodes are obtained from the node proposal mapping table; and the total number of proposal generations is determined based on the obtained numbers of proposal generations.

For example, referring to Table 5, after the second round of consensus, in the node proposal mapping table, the numbers of proposal generations corresponding to the node 1, the node 2, the node 3, and the node 4 are 1, 1, 0, and 0.

Based on the obtained numbers of proposal generations, it is determined that the total number of proposal generations is 2.

In the embodiment of the present disclosure, when the target proposal is obtained, the following two cases may occur, but the embodiments of the present disclosure are not limited thereto.

Case 1: when the consensus node x is a master node, the target proposal is generated for target transaction information after a consensus request from a client device for the target transaction information is obtained.

In the embodiment of the present disclosure, the target transaction information is information that a plurality of consensus nodes need to reach a consensus. The target transaction information includes, but is not limited to, an electronic money transaction record, a shared ledger operation record, a smart contract, or the like.

An example in which the consensus node x is the node 1 is used. Assuming that the node 1 is a master node, after obtaining the consensus request from the client device for the target transaction information, the node 1 generates the target proposal for the target transaction information.

Case 2: when the consensus node x is a slave node, the target proposal is obtained by the master node.

To ensure stable operation of an algorithm, each consensus node has a timer in the proposal stage to wait for generating a proposal by the master node. If the slave node receives, within set duration (the set duration is timed by the timer), no proposal generated by the master node, to ensure that the algorithm can be continued and a next round of consensus is entered as soon as possible, the slave nodes vote on a null proposal.

In the embodiment of the present disclosure, to ensure that the master node can generate a proposal in time, the set duration is generally set to be relatively large, for example, 30 seconds.

Specifically, if the slave node receives a proposal from the master node within set duration starting from obtaining the consensus request from the client device by the master node, the proposal is used as the target proposal, or if the slave node receives no proposal from the master node within the set duration starting from obtaining the consensus request from the client device by the master node, a null proposal is used as the target proposal.

An example in which the consensus node x is the node 2 is used. It is assumed that the node 1 is a master node, the node 2 is a slave node, and the set duration is 30 s. If the node 2 receives a proposal from the node 1 within set duration starting from obtaining the consensus request from the client device by the node 1, the proposal is used as the target proposal, or if no proposal from the node 1 is received within the set duration starting from obtaining the consensus request from the client device by the node 1, a null proposal is used as the target proposal.

Specifically, during execution of operation S301, when the target proposal is obtained and the locally recorded total number of proposal generations reaches the total number threshold, the consensus node x selects, from the plurality of consensus nodes, at least one consensus node with a number of proposal generations being less than a proposal generation threshold, and then uses one of the at least one consensus node as an abnormal node meeting the set node anomaly condition. The proposal generation threshold is determined based on a number of proposal generations corresponding to each consensus node.

Specifically, when the consensus node x uses one of the at least one consensus node as the abnormal node meeting the set node anomaly condition, the following mode may be used, but modes are not limited thereto:

- when a number of the at least one consensus node is one, the consensus node x uses the selected consensus node as the abnormal node meeting the set node anomaly condition, or
- when the number of the at least one consensus node is more than one, the consensus node x determines one consensus node from the more than one selected consensus nodes based on numbers of proposal generations corresponding to the at least one consensus node, and uses the determined consensus node as the abnormal node meeting the set node anomaly condition.

The proposal generation threshold may be determined based on an average value of numbers of proposal generations corresponding to the consensus nodes. For example, 1/10 of an average value of numbers of proposal generations (a total number of proposal generations, for example, equal to a total number threshold) corresponding to all consensus nodes may be used as the proposal generation threshold. In the embodiment of the present disclosure, an average value of numbers of proposal generations corresponding to all consensus nodes is only used as an example. In an actual application process, another statistical value such as a median may alternatively be used.

When one consensus node is determined from the plurality of selected consensus nodes, a consensus node with a smallest number of proposal generations may be used as the determined consensus node. Alternatively, any one of the plurality of selected consensus nodes may be used as the determined consensus node. This is not limited, and details are not described herein.

An example in which the total number threshold is 1000 is used. Because each consensus node records cases of proposals generated for the last 1000 times, when a node becomes a master node, other nodes analyze the cases of proposals generated for the last 1000 times. Under normal conditions, in a record of proposals generated for the last 1000 times, the number of proposal generations corresponding to each consensus node is to be average. If in a record of proposals generated for the last 1000 times, a number of proposal generations corresponding to a consensus node is less than the proposal generation threshold (for example, 1/10 of the average value of the numbers of proposal generations), the node is an abnormal node (also referred to as a faulty node). The consensus node may remove the abnormal node from a consensus by voting, to ensure that consensus nodes participating in the consensus are all normal nodes.

Four consensus nodes are used as an example. Among proposals generated in the last 1000 times, if a consensus node has normal system resources and operates normally, the number of proposal generations corresponding to this node is to be close to 250. If a consensus node generates proposals for only 25 times among the proposals generated in the last 1000 times, other nodes can determine that the consensus node is an abnormal node. The abnormal node may be subjected to abnormal operation caused by downtime, network fault, or the like, because if the abnormal node is a node that has normal system resources and operates normally, the number of proposal generations corresponding to the abnormal node among historical proposal generations for the last 1000 times is not only 1/10 of the average value of the numbers of proposal generations. Therefore, when a proposal is generated for a $1001^{st}$ time, consensus nodes may vote based on the historical proposals to remove an abnormal node with a number of proposal generations among the proposal generations for the last 1000 times being less than 1/10 of the average value of the numbers of proposal generations.

For example, the node 1 is a master node, the node 2, the node 3, and the node 4 are all slave nodes, the total number threshold is 1000, and the proposal generation threshold is 1/10 of the average value of the numbers of proposal generations, and is 1000/4×1/10=25. The numbers of proposal generations corresponding to the node 1, the node 2, the node 3, and the node 4 are, for example, 340, 320, 320, and 20. The node 1 is used as an example. When the node 1 obtains the target proposal, and a total number of proposal generations recorded locally by the node 1 reaches 1000, the node 1 selects at least one consensus node with a number of proposal generations being less than 25 from the consensus nodes, and the selected consensus node is the node 4. In this case, the node 1 uses the node 4 as an abnormal node meeting a set node anomaly condition.

For another example, the node 1 is a master node, the node 2, the node 3, and the node 4 are all slave nodes, the total number threshold is 1000, and the proposal generation threshold is 1/10 of the average value of the numbers of proposal generations, and is 1000/4×1/10=25. The numbers of proposal generations by the node 1, the node 2, the node 3, and the node 4 are, for example, 476, 480, 24, and 20. The node 1 is used as an example. When the node 1 obtains the target proposal, and a total number of proposal generations recorded locally by the node 1 reaches 1000, the node 1 selects at least one consensus node with a number of proposal generations being less than 25 from the consensus nodes, and the selected consensus nodes include the node 3 and the node 4. In this case, the consensus node 1 obtains, from the node 3 and the node 4 based on the numbers of proposal generations respectively corresponding to the node 3 and the node 4, a consensus node with a smallest number of proposal generations: the node 4, as a determined consensus node, and the node 4 is used as an abnormal node meeting the set node anomaly condition.

Each of the plurality of consensus nodes may obtain the numbers of node proposal generations corresponding to the plurality of consensus nodes from the locally recorded node proposal map, then select consensus nodes with a value less than 1/10 of an average value of the numbers of proposal generations from the plurality of consensus nodes, and then determine an abnormal node from the selected consensus nodes.

S302: The consensus node x transmits a first vote in a prevote stage to other consensus nodes among the plurality of consensus nodes except the consensus node x, and receives one or more first votes in the prevote stage that are transmitted by the other consensus nodes. The first vote transmitted by the consensus node x carries the node identifier of the abnormal node.

In the embodiment of the present disclosure, the first vote in the prevote stage may also be referred to as a prevote vote. Each of the plurality of consensus nodes generates a prevote vote in the prevote stage, and adds an id of a node that needs to be removed, namely the node identifier of the abnormal node, to vote content of the prevote vote. Then, each consensus node broadcasts the prevote vote generated by the consensus node to other nodes among the plurality of consensus nodes, and receives prevote votes transmitted by the other nodes. That the consensus node x generates and broadcasts the prevote vote and that the consensus node x receives the prevote votes transmitted by the other nodes is not limited in the embodiment of the present disclosure are in an order without limitation, and may be performed in parallel.

Figure 6:
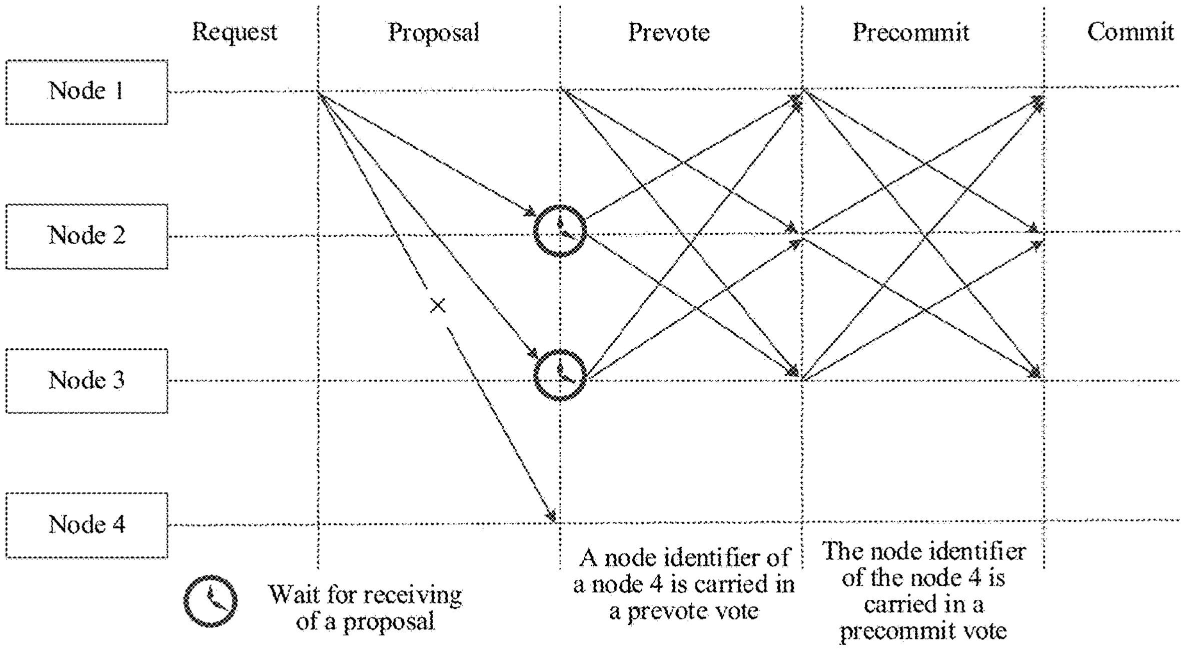
FIG. 6 is a schematic logic diagram of another node consensus process according to an embodiment of the present disclosure.

FIG. 6 is a schematic logic diagram of another node consensus process according to an embodiment of the present disclosure. An example in which the consensus node x is the node 1 is used. Referring to FIG. 6, it is assumed that an abnormal node determined in operation S301 is the node 4. In a prevote stage of a Byzantine consensus, the node 1 generates a prevote vote, and the prevote vote carries a node identifier of the node 4: nodeID4. Then, the node 1 broadcasts the prevote vote generated by the node to the node 2, the node 3, and the node 4, and receives prevote votes transmitted by the node 2, the node 3, and the node 4. That the node 1 generates and broadcasts the prevote vote and that the node receives the prevote votes transmitted by the other nodes are in an order without limitation in the embodiment of the present disclosure, and may be performed in parallel.

S303: The consensus node x transmits a second vote in a precommit stage to the other consensus nodes, and receives one or more second votes in the precommit stage that are transmitted by the other consensus nodes, when a number of first votes carrying the node identifier of the abnormal node in the received one or more first votes reaches a first vote number threshold. The second vote transmitted by the consensus node carries the node identifier of the abnormal node.

In the embodiment of the present disclosure, the second vote in the precommit stage may also be referred to as a precommit vote. The first vote number threshold may be 2n/3+1, where n represents a number of the plurality of consensus nodes. When the value of 2n/3+1 is not an integer, rounding down may be used to obtain the first vote number threshold. For example, when there are four consensus nodes, the first vote number threshold is 2n/3+1, and the consensus node x enters the precommit stage when the number of received first votes carrying the node identifier of the abnormal node reaches 3.

If the first votes received by the consensus node x may include the first vote generated by the consensus node x, the first vote number threshold may be 2n/3+1. If the first votes received by the consensus node x may alternatively not include the first vote generated by the consensus node x, the first vote number threshold may be 2n/3. This is not limited.

If each of the plurality of consensus nodes receives at least 2n/3+1 prevote votes carrying the same node identifier (namely the node identifier of the abnormal node) in the second stage (prevote stage), in the third stage (precommit stage), the consensus node generates a precommit vote, adds an id of a node needing to be removed, namely the node identifier of the abnormal node, to vote content of the precommit vote, then broadcasts the precommit vote generated by the consensus node to other nodes among the plurality of consensus nodes, and receives precommit votes transmitted by the other nodes. An example in which the consensus node x is the node 1 is used. Referring to FIG. 6, it is assumed that an abnormal node determined in operation S301 is the node 4. In the prevote stage of the Byzantine consensus, when the node 1 receives prevote votes from the node 2, the node 3, and the node 4, and the prevote votes from the node 2, the node 3, and the node 4 all carry nodeID4, it is determined that the number of received first votes carrying nodeID4 reaches 2. Then, the node 1 transmits a precommit vote to the node 2, the node 3, and the node 4, where the precommit vote carries nodeID4, and the node receives precommit votes transmitted by the node 2, the node 3, and the node 4. Because the node 4 is abnormal, the node cannot participate in voting, that is, the node cannot receive or transmit a prevote vote and a precommit vote. Therefore, FIG. 6 does not show a process of transmitting a vote to the node 4.

In the embodiment of the present disclosure, if the number of first votes carrying the node identifier of the abnormal node among the received first votes does not reach the first vote number threshold, and the number of the received first votes reaches the first vote number threshold, the consensus node x may directly enter the precommit stage, and generate a precommit vote carrying no node identifier. That the consensus node x generates and broadcasts the precommit vote and that the consensus node x receives the precommit votes transmitted by the other nodes are in an order not limited in the embodiment of the present disclosure, and may be performed in parallel.

S304: The consensus node x determines that a consensus is reached on the target proposal, and deletes the abnormal node from the plurality of locally recorded consensus nodes, when a number of second votes carrying the node identifier of the abnormal node in the received one or more second votes reaches a second vote number threshold.

The second vote number threshold may be the same as or different from the first vote number threshold. Herein, an example in which the second vote number threshold is the same as the first vote number threshold is used for description.

If each of the plurality of consensus nodes receives at least 2n/3+1 precommit votes carrying the same node identifier (namely the node identifier of the abnormal node) in the third stage (precommit stage), it is determined that a consensus is reached on the target proposal, and the abnormal node is deleted from the plurality of consensus nodes. Further, if the target proposal on which a consensus is reached is a null proposal, the target proposal is not committed, or if the target proposal on which a consensus is reached is a non-null proposal, the target proposal is committed.

The consensus node x being the node 1 is still used as an example. Referring to FIG. 6, it is assumed that the abnormal node determined in operation S301 is the node 4, and in the precommit stage of the Byzantine consensus, the second vote number threshold is 3. When the node 1 receives precommit votes from the node 2, the node 3, and the node 4, and the precommit votes from the node 2, the node 3, and the node 4 all carry nodeID4, it is determined that the number of received first votes carrying nodeID4 reaches 3. Then, the node 1 determines that a consensus is reached on the target proposal, and deletes nodeID4 from locally recorded consensus nodes. The consensus nodes after the deletion include: the node 1, the node 2, and the node 3.

Further, after a node is deleted or added, the consensus node resets the numbers of proposal generations respectively corresponding to locally recorded remaining consensus nodes in the distributed system, and resets the locally recorded total number of proposal generations.

The consensus node resets the numbers of proposal generations respectively corresponding to the plurality of locally recorded consensus nodes in the distributed system and the total number of proposal generations to an initial value. For example, the initial value is 0.

The consensus node x being the node 1 is still used as an example. Referring to FIG. 6, for the node proposal map locally recorded by the node 1, the node identifier of the node 4 and the corresponding value are deleted from the node proposal map, and the numbers of proposal generations respectively corresponding to the node 1, the node 2, and the node 3 that are recorded in the node proposal map are reset to 0. Because the sum of the numbers of proposal generations corresponding to the consensus nodes is the total number of proposal generations, the total number of proposal generations is also reset to 0.

In the embodiment of the present disclosure, by analysis of a historical proposal record, an id of a node that needs to be removed (namely the node identifier of the abnormal node) is attached to node votes (the prevote votes and the precommit vote). Finally, through security guarantee by the Byzantine consensus protocol, it is ensured that all nodes unanimously remove the node that needs to be removed from a consensus. In this way, an entire consensus network can safely and correctly remove the faulty node when encountering node failure, and it is finally ensured to a maximum extent that all nodes participating in a consensus are normal nodes, thereby greatly improving performance of an entire blockchain network.

Description is provided below with reference to a specific embodiment.

Figure 7:
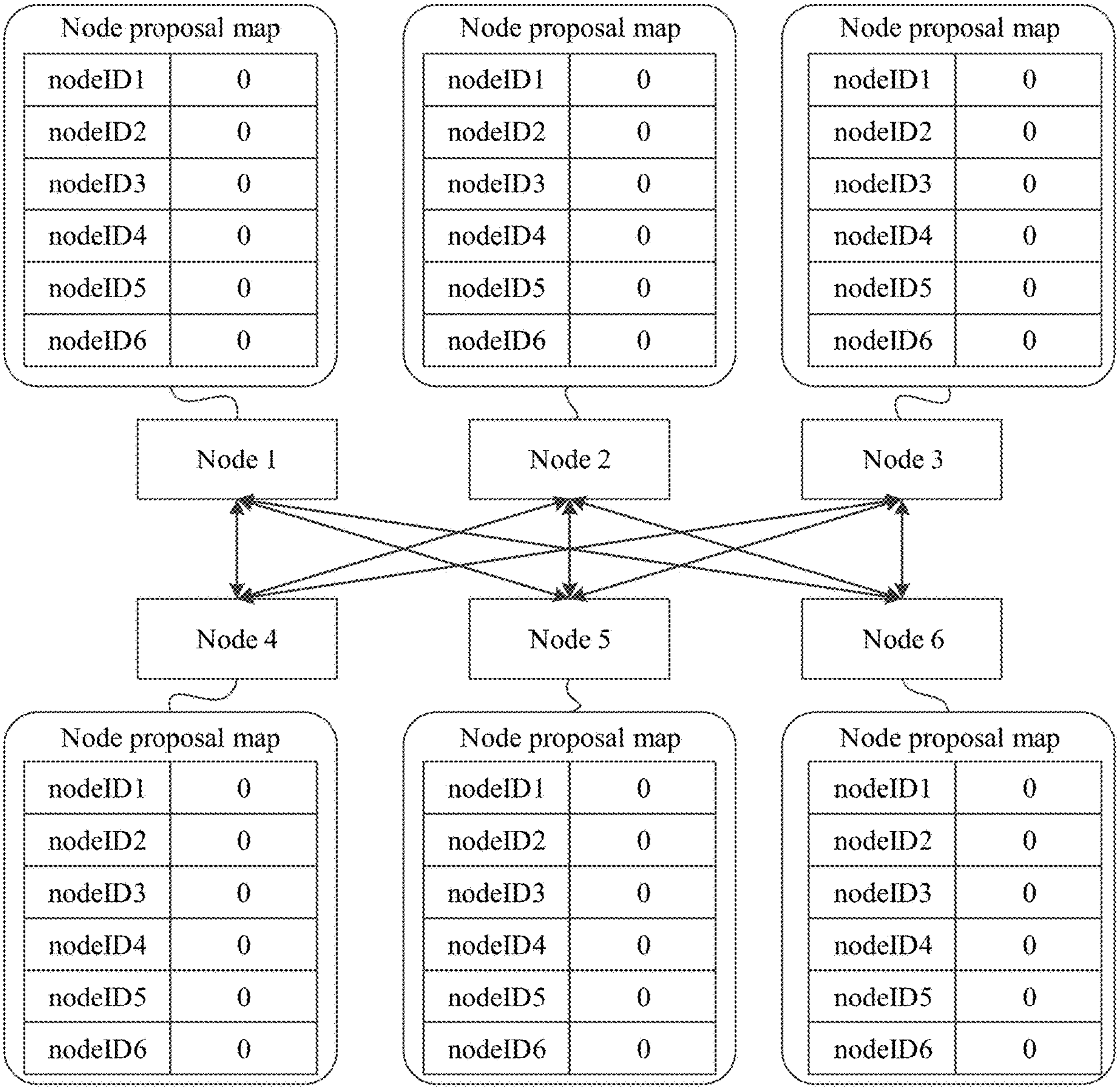
FIG. 7 is a schematic diagram of an initial node proposal map according to an embodiment of the present disclosure.

FIG. 7 is a schematic diagram of an initial node proposal map according to an embodiment of the present disclosure. Referring to FIG. 7, a distributed system includes six consensus nodes, and the six consensus nodes are a node 1 to a node 6. Each of the node 1 to the node 6 has a node proposal map recorded locally. Each node maintains a node proposal map, and the node proposal map includes node IDs of the node 1 to the node 6. A value corresponding to each node ID is initialized to be 0.

It is assumed that the node 4 becomes an abnormal node because of downtime or for another reason, and the remaining five nodes are all normal nodes.

Figure 8:
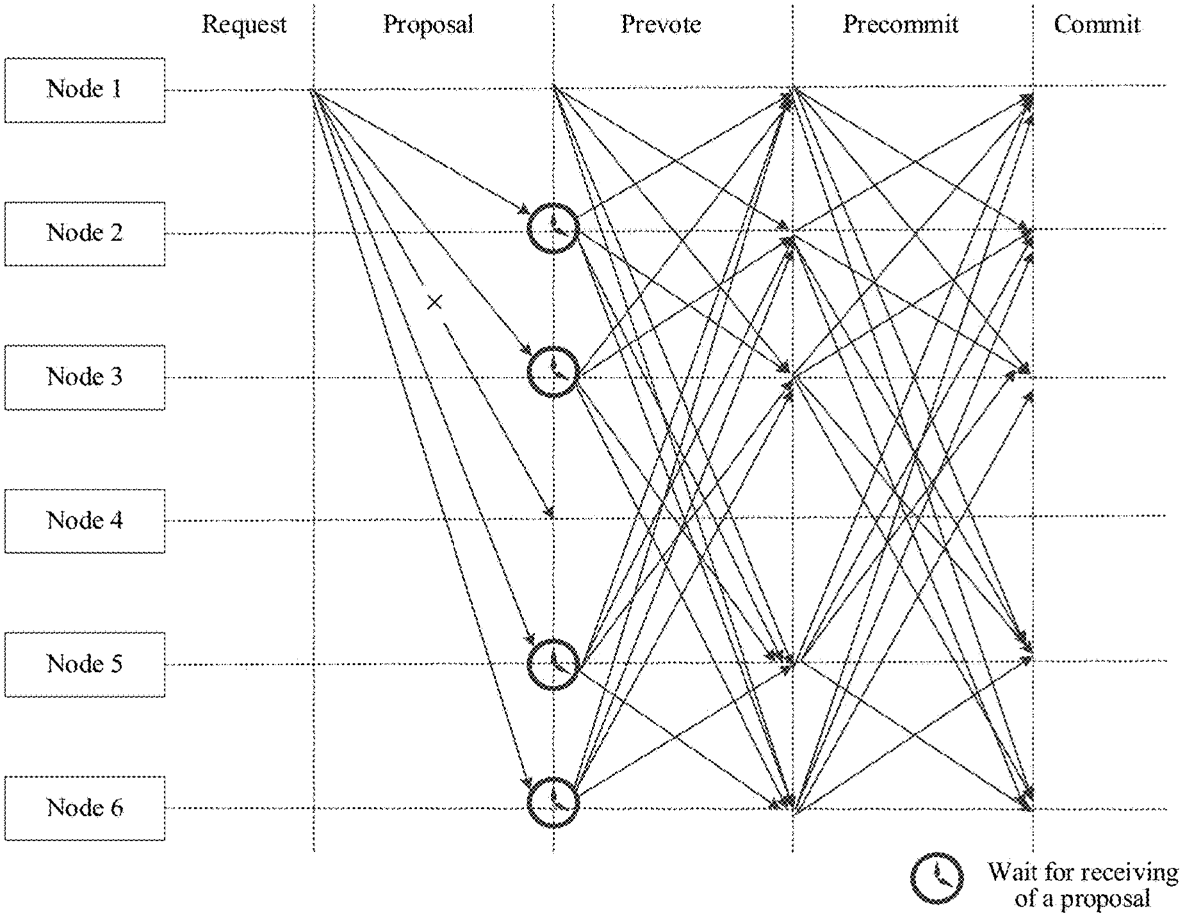
FIG. 8 is a schematic logic diagram of a first round of consensus process according to an embodiment of the present disclosure.

FIG. 8 is a schematic logic diagram of a first round of consensus process according to an embodiment of the present disclosure. During a first round of consensus, a node 1 becomes a master node. Referring to FIG. 8, the node 1 is a normal node. Therefore, after the node 1 receives a consensus request from a client device, the node 1 generates a proposal, broadcasts the proposal to a node 2 to a node 6, generates a prevote vote in a prevote stage, and broadcasts the prevote vote of the node to the node 2 to the node 6.

The node 2, the node 3, the node 5, and the node 6 are all normal nodes. Therefore, after receiving the proposal from the node 1, each of the node 2, the node 3, the node 5, and the node 6 generates a prevote vote in the prevote stage, and broadcasts the prevote vote of the node to other nodes.

After each of the node 1, the node 2, the node 3, the node 5, and the node 6 receives 2×6/3+1=5 prevote votes, in the precommit stage, the node generates a precommit vote, and broadcasts the precommit vote of the node to other nodes.

Figure 9:
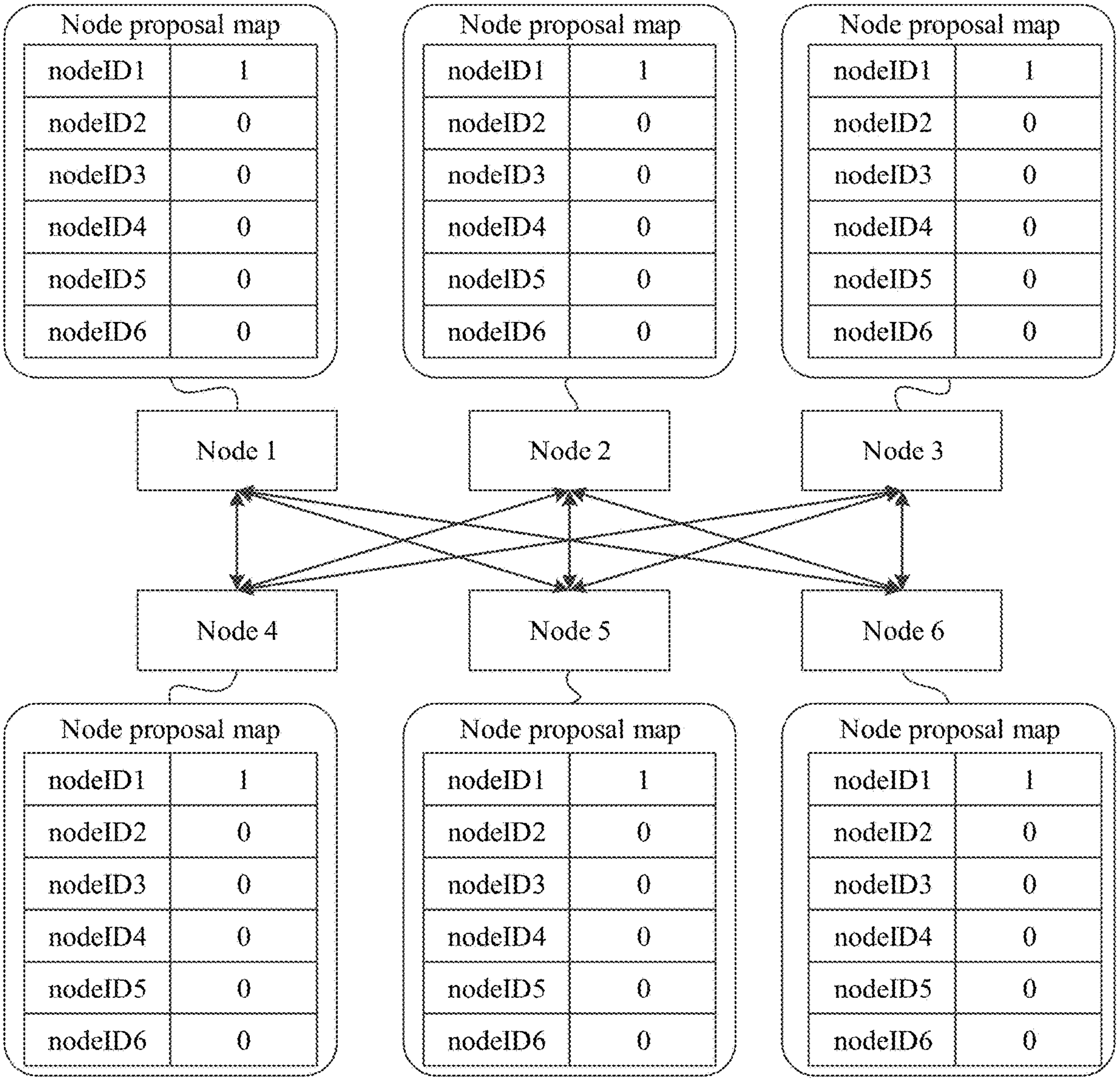
FIG. 9 is a schematic diagram of a node proposal map after a first round of consensus according to an embodiment of the present disclosure.

After receiving received 2×6/3+1=5 precommit votes, each of the node 1, the node 2, the node 3, the node 5, and the node 6 determines that a consensus is reached on the proposal, and commits the proposal when the proposal is not a null proposal. After the proposal is committed, the node 1 to the node 6 are all in a node proposal map maintained by the nodes, and 1 is added to a value corresponding a key being a node id of the node 1, that is, 1 is added to the number of proposal generations corresponding to the node 1. FIG. 9 is a schematic diagram of a node proposal map after a first round of consensus according to an embodiment of the present disclosure. Referring to FIG. 9, after a consensus is finally reached, in the node proposal map of each node, values of the node ids are as follows: numbers of proposal generations respectively corresponding to the node 1 to the node 6 are 1, 0, 0, 0, 0, and 0.

Figure 10:
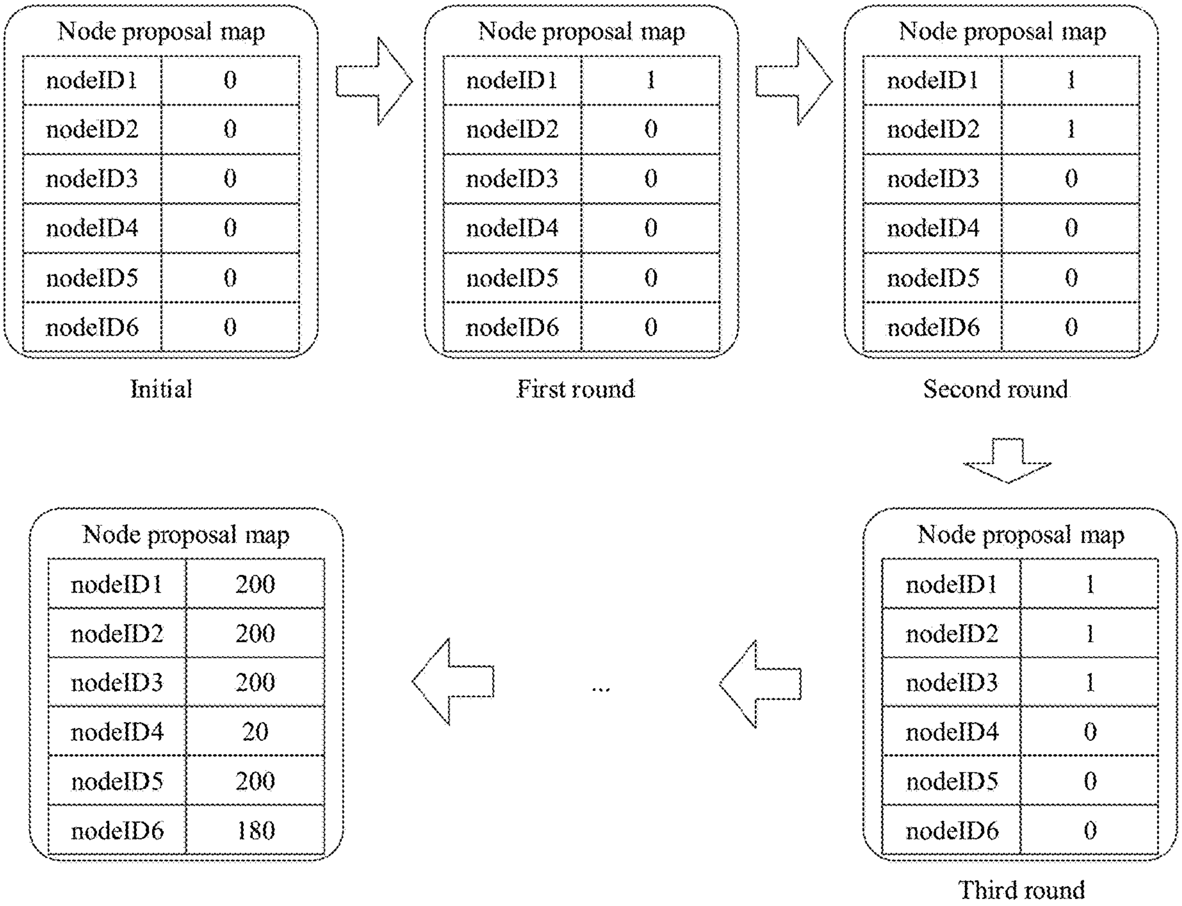
FIG. 10 is a schematic diagram of a node proposal map in a multi-round consensus process according to an embodiment of the present disclosure.

During a second round of consensus, the node 2 becomes a master node. After the node 2 generates a proposal, the node 1 to the node 6 reach a consensus on the proposal generated by the node 2. Since the process of consensus on the proposal generated by the node 2 is the same/similar as the process of consensus on the proposal generated by the node 1, details are not described herein. FIG. 10 is a schematic diagram of a node proposal map in a multi-round consensus process according to an embodiment of the present disclosure. Referring to FIG. 10, after a consensus is finally reached, in a node proposal map of each node, values of node ids are as follows: numbers of proposal generations respectively corresponding to the node 1 to the node 6 are 1, 1, 0, 0, 0, and 0.

During a third round of consensus, the node 3 becomes a master node. After the node 3 generates a proposal, the node 1 to the node 6 reach a consensus on the proposal generated by the node 3. Because the process of consensus on the proposal generated by the node 3 is the same/similar as the process of consensus on the proposal generated by the node 1 or 2, details are not described herein. Referring to FIG. 10, after a consensus is finally reached, in a node proposal map of each node, values of node ids are as follows: numbers of proposal generations respectively corresponding to the node 1 to the node 6 are 1, 1, 1, 0, 0, and 0.

Figure 11:
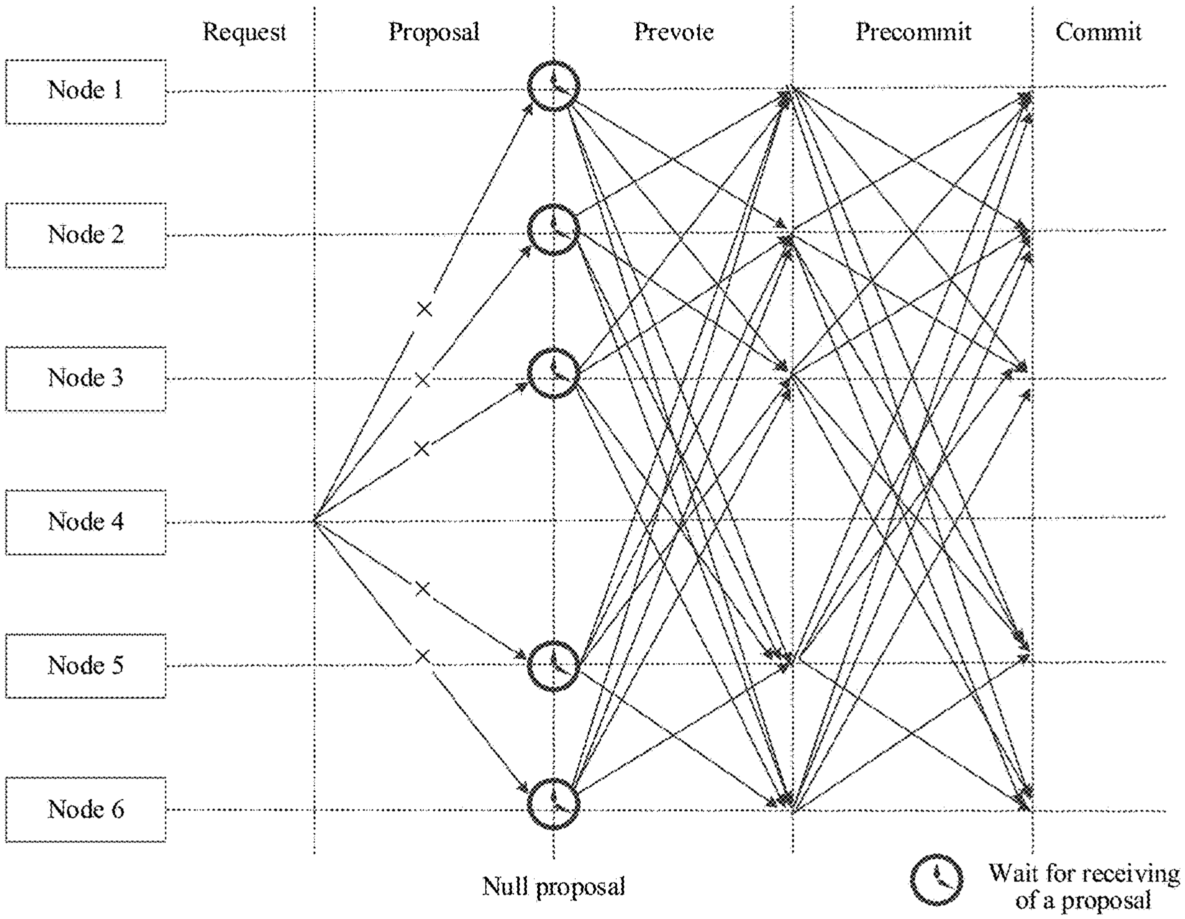
FIG. 11 is a schematic logic diagram of a fourth round of consensus process according to an embodiment of the present disclosure.

FIG. 11 is a schematic logic diagram of a fourth round of consensus process according to an embodiment of the present disclosure. Referring to FIG. 11, during a fourth round of consensus, the node 4 becomes a master node. Because the node 4 is a faulty node, the node cannot generate a proposal. Therefore, starting from obtaining the consensus request from the client device by the node 4, the node 1, the node 2, the node 3, the node 5, and the node 6 each start a timer during waiting for generation of a proposal by the node 4. If no proposal generated by the node 4 is received within set duration, the node 1, the node 2, the node 3, the node 5, and the node 6 generate votes on a null proposal, and reach a consensus on the null proposal.

Because the node 1, the node 2, the node 3, the node 5, and the node 6 receive no proposal, finally no operation of adding 1 to the value corresponding to a key being a node id of the node 4 is performed in each node proposal map. After a consensus is reached on a null proposal, the null proposal is not committed by a blockchain, but a node is switched to continue to generate a proposal. Therefore, after the node 4 generates no proposal, and finally other nodes vote on a null proposal upon overtime to reach a consensus, the value of the node 4 does not change. In a node proposal map of each node, values of node ids are as follows: numbers of proposal generations respectively corresponding to the node 1 to the node 6 are 1, 1, 1, 0, 0, and 0.

With the progress of the consensus, the values of the node 1, the node 2, the node 3, the node 5, and the node 6 continue to increase, but the node 4 is a faulty node. Therefore, the value of the node 4 does not increase or increases slowly because of network and machine performance. When the values of all nodes reach 1000, the value of the node 4 does not reach 1/10 of an average value, namely 166, of the numbers of proposal generations, namely 16. It is assumed that currently in a node proposal map of each node, values of node ids are as follows: 200, 200, 200, 15, 200, and 185.

Figure 12A:
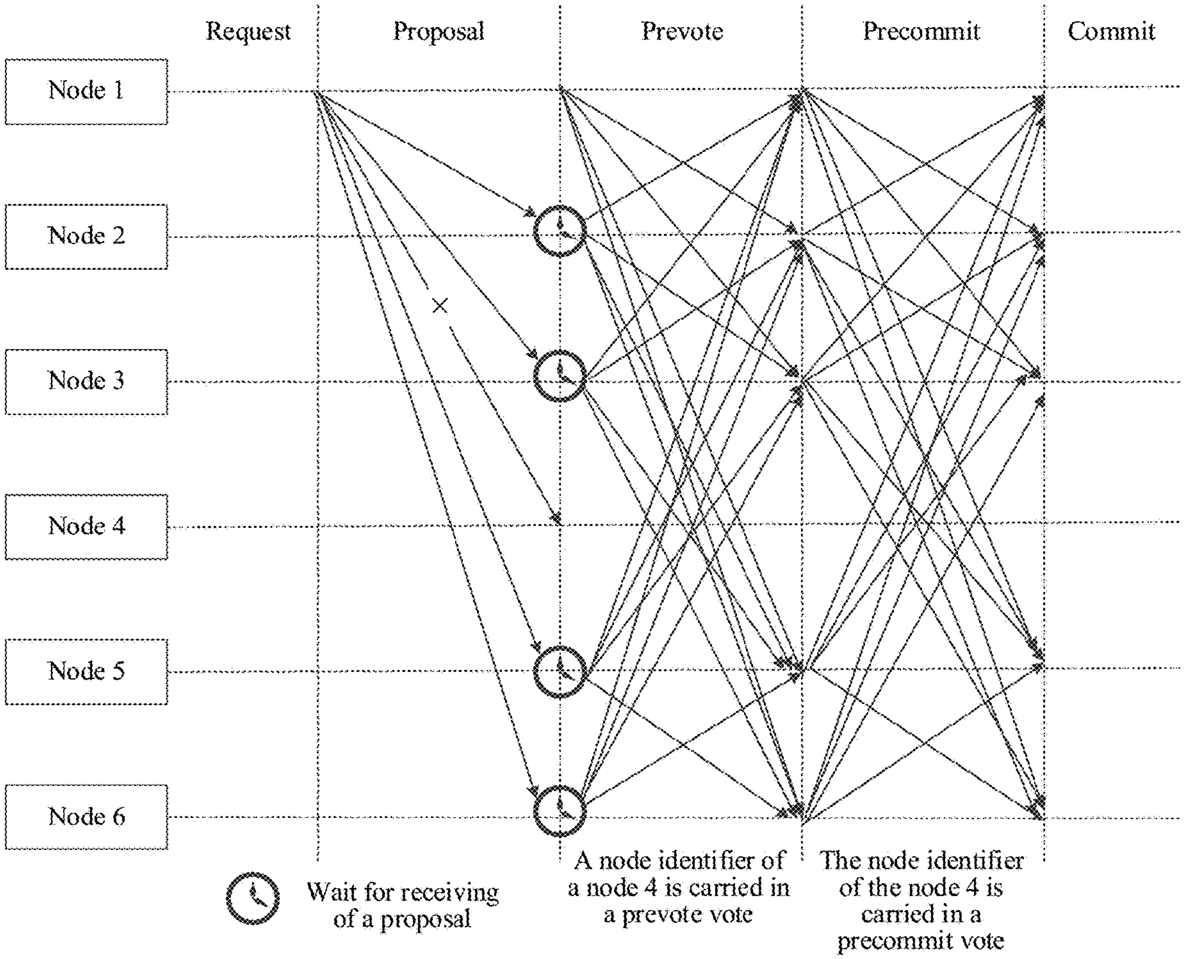
FIG. 12A is a schematic logic diagram of one round of consensus process according to an embodiment of the present disclosure.

FIG. 12A is a schematic logic diagram of one round of consensus process according to an embodiment of the present disclosure. Referring to FIG. 12A, when a target proposal is obtained, and a sum of values of node ids in a locally recorded node proposal map reaches 1000 (that is, a total number of proposal generations reaches 1000), each node selects a consensus node with a number of proposal generations being less than 16 from the plurality of consensus nodes as an abnormal node. The abnormal node is a node 4. Then, each node generates a prevote vote, and the prevote vote carries nodeID4. The node broadcasts the prevote vote generated by the node to other nodes, and receives prevote votes transmitted by the other nodes. Each node generates a precommit vote when receiving no less than 2×6/3+1=5 precommit votes carrying the same node identifier, and the precommit vote carries nodeID4. The node broadcasts the precommit vote generated by the node to other nodes, and receives precommit votes transmitted by the other nodes. When each node receives no less than 2×6/3+1=5 precommit votes carrying the same node identifier, it is determined that a consensus is reached on the proposal, and the node 4 is deleted from the plurality of consensus nodes. In the embodiment of the present disclosure, since the node 4 cannot receive or transmit a vote, FIG. 12A does not show a process in which each node transmits a vote to the node 4.

Figure 12B:
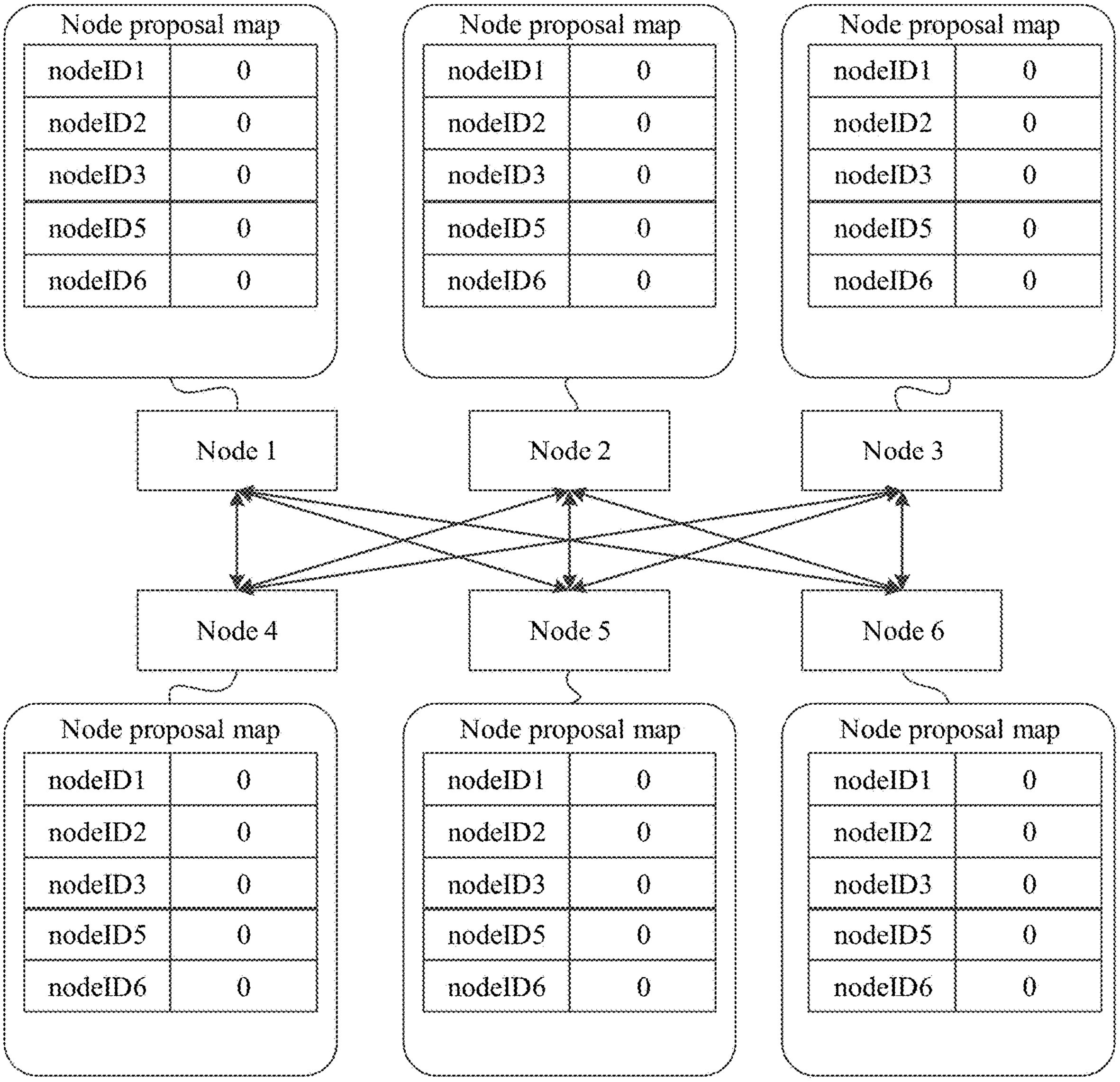
FIG. 12B is a schematic diagram of a node proposal map after deletion of an abnormal node according to an embodiment of the present disclosure.

FIG. 12B is a schematic diagram of a node proposal map after deletion of an abnormal node according to an embodiment of the present disclosure. Further, referring to FIG. 12B, for the node proposal map locally recorded by each node, the node identifier of the node 4 and the corresponding value are deleted from the node proposal map, and the numbers of proposal generations respectively corresponding to the node 1, the node 2, the node 3, the node 5, and the node 6 that are recorded in the node proposal map are reset to 0. Because the sum of the numbers of proposal generations respectively corresponding to the plurality of consensus nodes is the total number of proposal generations, the total number of proposal generations is also reset to 0.

By the foregoing implementation, when a node becomes a faulty node, after consensus for several times, a value of the node does not increase. However, other nodes are normal nodes, the other nodes generate proposals, causing the values to increase. After proposals are generated for 1000 times, the value of the faulty node is very low. If the value is less than 1/10 of an average value of the numbers of proposal generations, it may be basically determined that the node is faulty, and voting is performed to remove the node from consensus nodes, to ensure that nodes participating in the consensus are all normal nodes, so that performance of the blockchain is restored to normal.

Figure 13:
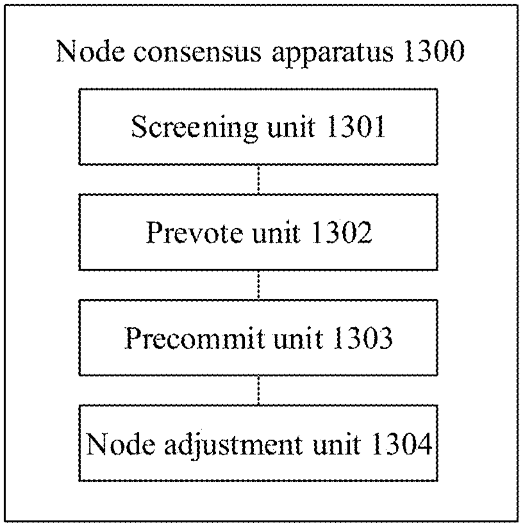
FIG. 13 is a schematic structural diagram of a node consensus apparatus according to an embodiment of the present disclosure.

Based on the same inventive concept, an embodiment of the present disclosure provides a node consensus apparatus. FIG. 13 is a schematic structural diagram of a node consensus apparatus 1300, which may include:

- a screening unit 1301, configured to select, based on numbers of proposal generations respectively corresponding to a plurality of locally recorded consensus nodes in a distributed system, an abnormal node meeting a set node anomaly condition from the plurality of consensus nodes when a target proposal is obtained and a locally recorded total number of proposal generations reaches a total number threshold, the plurality of consensus nodes including the consensus node;
- a prevote unit 1302, configured to transmit a first vote in a prevote stage to other consensus nodes among the plurality of consensus nodes except the consensus node, and receive one or more first votes in the prevote stage that are transmitted by the other consensus nodes, the first vote transmitted by the consensus node carrying a node identifier of the abnormal node;
- a precommit unit 1303, configured to transmit a second vote in a precommit stage to the other consensus nodes, and receive one or more second votes in the precommit stage that are transmitted by the other consensus nodes, when a number of first votes carrying the node identifier of the abnormal node in the received one or more first votes reaches a first vote number threshold, the second vote transmitted by the consensus node carrying the node identifier of the abnormal node; and a node adjustment unit 1304, configured to determine that a consensus is reached on the target proposal, and delete the abnormal node from the plurality of locally recorded consensus nodes, when a number of second votes carrying the node identifier of the abnormal node in the received one or more second votes reaches a second vote number threshold.

In one embodiment, before the selection, based on the numbers of proposal generations respectively corresponding to the plurality of locally recorded consensus nodes in the distributed system, of the abnormal node meeting the set node anomaly condition from the plurality of consensus nodes when the target proposal is obtained and the locally recorded total number of proposal generations reaches the total number threshold, the screening unit 1301 is further configured to:

accumulate a number of proposal generations corresponding to a master node, and update the total number of proposal generations, when the plurality of consensus nodes reach a consensus on a non-null proposal generated for the master node during each round of consensus, where the master node is one of the plurality of consensus nodes.

In one embodiment, when the consensus node locally records node proposal mapping information, and the node proposal mapping information includes: node identifiers of the plurality of consensus nodes and numbers of proposal generations corresponding to the plurality of consensus nodes, the screening unit 1301 is configured to determine the locally recorded total number of proposal generations in the following mode:

numbers of proposal generations respectively corresponding to the plurality of consensus nodes are obtained from the node proposal mapping information; and the total number of proposal generations is determined based on the obtained numbers of proposal generations respectively corresponding to the plurality of consensus nodes.

In one embodiment, during the selection, based on the numbers of proposal generations respectively corresponding to the plurality of locally recorded consensus nodes in the distributed system, of the abnormal node meeting the set node anomaly condition from the plurality of consensus nodes, the screening unit 1301 is specifically configured to:

select, from the plurality of consensus nodes, at least one consensus node with a number of proposal generations being less than a proposal generation threshold; and determine one of the at least one consensus node as the abnormal node meeting the set node anomaly condition.

In one embodiment, during the determining of one of the at least one consensus node as the abnormal node meeting the set node anomaly condition, the screening unit 1301 is specifically configured to:

use, when a number of the at least one consensus node is one, the selected consensus node as the abnormal node meeting the set node anomaly condition, or determine, when the number of the at least one consensus node is more than one, one consensus node from the more than one selected consensus nodes based on numbers of proposal generations respectively corresponding to the at least one consensus node, and use the determined consensus node as the abnormal node meeting the set node anomaly condition.

In one embodiment, after the deletion of the abnormal node from the plurality of locally recorded consensus nodes, the screening unit 1301 is further configured to:

reset numbers of proposal generations respectively corresponding to locally recorded remaining consensus nodes in the distributed system; and reset the locally recorded total number of proposal generations.

In one embodiment, the screening unit 1301 is further configured to:

generate the target proposal for target transaction information after a consensus request from a client device for the target transaction information is obtained, when the consensus node is a master node, or obtain the target proposal by the master node when the consensus node is a slave node.

In one embodiment, during the obtaining of the target proposal by the master node, the screening unit 1301 is specifically configured to:

use a proposal from the master node as the target proposal when the proposal from the master node is received within set duration starting from obtaining the consensus request from the client device by the master node, or use a null proposal as the target proposal when no proposal from the master node is received within the set duration starting from obtaining the consensus request from the client device by the master node.

For ease of description, the above parts fall into modules (or units) based on functions for separate description. Certainly, when the present disclosure is implemented, functions of the modules (or units) can be implemented in one or more pieces of software or hardware.

With regard to the apparatus in the above-mentioned embodiments, the specific mode in which each unit executes a request has been described in detail in the embodiments related to the method, and is not described in detail herein.

A person skilled in the art can understand that various aspects of the present disclosure can be implemented as a system, a method, or a program product. Therefore, various aspects of the present disclosure may be specifically implemented in the following forms, namely: a complete hardware implementation, a complete software implementation (including firmware, microcode, and the like), or an implementation combining hardware and software aspects, which may be collectively referred to as a "circuit", a "module", or a "system" herein.

Figure 14:
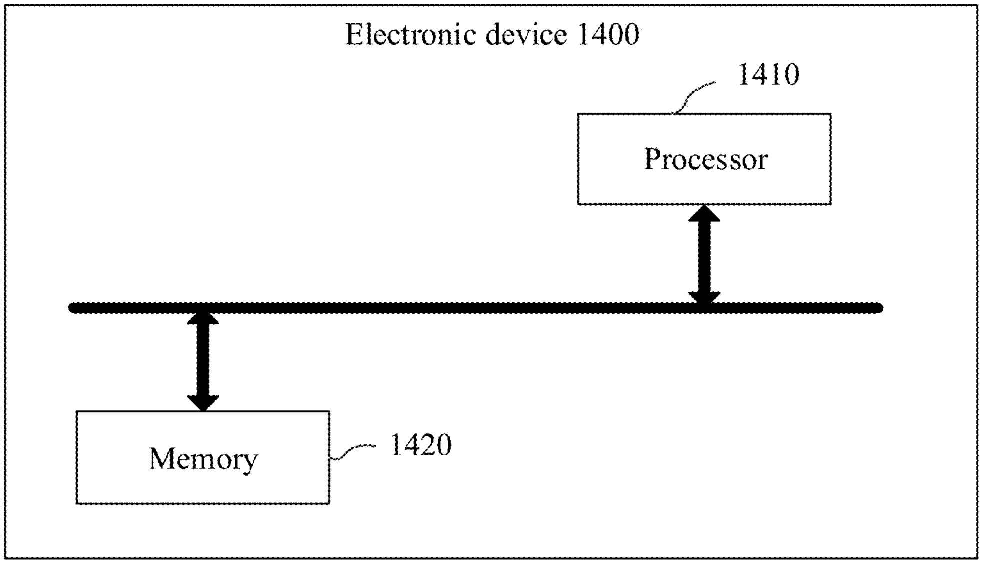
FIG. 14 is a schematic structural diagram of an electronic device according to an embodiment of the present disclosure.

Based on the same inventive concept, an embodiment of the present disclosure further provides an electronic device. In an embodiment, the electronic device may be a server or a terminal device. FIG. 14 is a schematic structural diagram of an exemplary electronic device according to an embodiment of the present disclosure. As shown in FIG. 14, an electronic device 1400 includes: a processor 1410 and a memory 1420.

The memory 1420 stores a computer program executable by the processor 1410, and the processor 1410 can execute the operations of the above-mentioned node consensus method by executing an instruction stored in the memory 1420.

The memory 1420 may be a volatile memory, such as a random access memory (RAM). The memory 1420 may alternatively be a non-volatile memory, such as a read-only memory (ROM), a flash memory, a hard disk drive (HDD), or a solid-state drive (SSD). Alternatively, the memory 1420 is any other medium that can be configured to carry or store desired program code in the form of an instruction or a data structure and that can be accessed by a computer, but is not limited thereto. The memory 1420 may alternatively be a combination of the above memories.

The processor 1410 may include one or more central processing units (CPUs) or be a digital processing unit, or the like. The processor 1410 is configured to implement the above-mentioned node consensus method when executing the computer program stored in the memory 1420.

In some embodiments, the processor 1410 and the memory 1420 may be implemented on the same chip. In some embodiments, they may alternatively be implemented separately on independent chips.

A specific connection medium between the processor 1410 and the memory 1420 is not limited in the embodiment of the present disclosure. In the embodiment of the present disclosure, an example in which the processor 1410 is connected to the memory 1420 by a bus is used, and the bus is described with a thick line in FIG. 14. Connection modes between other components are only for schematic illustration and are not used for a limitation. The bus may include an address bus, a data bus, a control bus, or the like. For ease of description, only one thick line is used in FIG. 14 for description, but there is no description of only one bus or one type of bus.

Based on the same inventive concept, an embodiment of the present disclosure provides a computer-readable storage medium, including a computer program, when the computer program is run on an electronic device, the computer program being used for causing the electronic device to perform the operations of the node consensus method described above. In some embodiments, various aspects of the node consensus method according to the present disclosure may alternatively be implemented in the form of a program product, which includes a computer program. When the program product is run on an electronic device, the computer program is used for causing the electronic device to perform the operations of the above-mentioned node consensus method. For example, the electronic device may perform the operations shown in FIG. 3.

As disclosed herein, when one of a plurality of consensus nodes in a distributed system obtains a target proposal and a total number of proposal generations that is locally recorded by the consensus node reaches a total number threshold, an abnormal node is selected from the plurality of consensus nodes based on numbers of proposal generations respectively corresponding to the plurality of consensus nodes locally recorded by the consensus node. Then the consensus node carries a node identifier of the abnormal node in a first vote in a prevote stage of the consensus node, and broadcasts the first vote of the consensus node to other consensus nodes among the plurality of consensus nodes except the consensus node. In addition, the consensus node further receives first votes transmitted by the other consensus nodes in the prevote stage. When a number of the received first votes carrying the node identifier of the abnormal node reaches a first vote number threshold, the consensus node broadcasts a second vote in a precommit stage that carries the node identifier of the abnormal node, and receives second votes in the precommit stage that are transmitted by the other consensus nodes. Then the consensus node determines that a consensus is reached on the target proposal, and deletes the abnormal node from the plurality of consensus nodes locally recorded by the consensus node, when a number of the received second votes carrying the node identifier of the abnormal node reaches a second vote number threshold.

In this way, the consensus node in the distributed system analyzes a historical proposal record, so that the node identifier of the abnormal node is attached to the first vote and the second vote, and it is finally ensured through security guarantee by a Byzantine consensus protocol that all nodes unanimously remove the abnormal node from a consensus node list. Therefore, an entire consensus network can safely and correctly delete the abnormal node when encountering node failure, and it is finally ensured to a maximum extent that all nodes participating in a consensus are normal nodes, thereby greatly improving performance of an entire blockchain network.

The program product may be any combination of one or more readable media. The readable medium may be a readable signal medium or a readable storage medium. The readable storage medium may be, for example, but is not limited to, electric, magnetic, optical, electromagnetic, infrared, or semiconductor systems, apparatuses, or devices, or any combination thereof. More specific examples (a non-exhaustive list) of readable storage media include: an electrical connection having one or more wires, a portable disk, a hard disk, an RAM, a read-only memory (ROM), an erasable programmable read-only memory (EPROM or a flash memory), an optical fiber, a portable compact disc read-only memory (CD-ROM), an optical storage device, a magnetic storage device, or any appropriate combination thereof.

The program product according to the implementation of the present disclosure may use a CD-ROM and include a computer program, and can be run on an electronic device. However, the program product of the present disclosure is not limited thereto. Herein, the readable storage medium may be any tangible medium containing or storing a computer program, and the computer program may be used by or in combination with a command execution system, apparatus, or device.

The readable signal medium may include a data signal propagated in a baseband or as a part of a carrier, and a readable computer program is carried therein. The propagated data signal may be in various forms, including but not limited to an electromagnetic signal, an optical signal, or any suitable combination thereof. The readable signal medium may alternatively be any readable medium other than the readable storage medium. The readable medium can send, propagate, or transmit a computer program used by or in combination with a command execution system, apparatus, or device.

Although preferred embodiments of the present disclosure have been described, additional changes and modifications may be made to these embodiments by a person skilled in the art once basic inventive concepts are known. Therefore, the appended claims are intended to be construed as to cover the exemplary embodiments and all changes and modifications falling within the scope of the present disclosure.

Clearly, a person skilled in the art can make various modifications and variations to the present disclosure without departing from the spirit and scope of the present disclosure. In this case, if the modifications and variations made to the present disclosure fall within the scope of the claims of the present disclosure and their equivalent technologies, the present disclosure is intended to include these modifications and variations.

What is claimed is:

1. A node consensus method applied to a first consensus node of a plurality of consensus nodes, the method comprising:

selecting, based on numbers of proposal generations corresponding to the plurality of consensus nodes in a distributed system that are locally recorded, an abnormal node meeting a set node anomaly condition from the plurality of consensus nodes in response to a target proposal being obtained and a locally recorded total number of proposal generations reaching a total number threshold;

transmitting a first vote in a prevote stage to other consensus nodes among the plurality of consensus nodes except the first consensus node, and receiving one or more first votes in the prevote stage that are transmitted by the other consensus nodes, the first vote transmitted by the first consensus node carrying a node identifier of the abnormal node;

transmitting a second vote in a precommit stage to the other consensus nodes, and receiving one or more second votes in the precommit stage that are transmitted by the other consensus nodes, in response to a number of first votes carrying the node identifier of the abnormal node in the received one or more first votes reaching a first vote number threshold, and the second vote transmitted by the first consensus node carrying the node identifier of the abnormal node; and determining that a consensus is reached on the target proposal, and deleting the abnormal node from the plurality of consensus nodes that are locally recorded, in response to a number of second votes carrying the node identifier of the abnormal node in the received one or more second votes reaching a second vote number threshold.

2. The method according to claim 1, further comprising:

accumulating a number of proposal generations corresponding to a master node, and updating the total number of proposal generations, when the plurality of consensus nodes reach a consensus on a non-null proposal generated for the master node during each round of consensus, wherein the master node is one of the plurality of consensus nodes.

3. The method according to claim 2, wherein the first consensus node locally records node proposal mapping information, and the node proposal mapping information comprises: node identifiers of the plurality of consensus nodes and numbers of proposal generations corresponding to the plurality of consensus nodes, the locally recorded total number of proposal generations is determined in a following mode:

the numbers of proposal generations respectively corresponding to the plurality of consensus nodes are obtained from the node proposal mapping information; and the total number of proposal generations is determined based on the obtained numbers of proposal generations respectively corresponding to the plurality of consensus nodes.

4. The method according to claim 1, wherein selecting the abnormal node meeting the set node anomaly condition from the plurality of consensus nodes comprises:

selecting, from the plurality of consensus nodes, at least one consensus node with a number of proposal generations being less than a proposal generation threshold; and determining one of the at least one consensus node as the abnormal node meeting the set node anomaly condition.

5. The method according to claim 4, wherein determining one of the at least one consensus node as the abnormal node meeting the set node anomaly condition comprises:

using, when a number of the at least one consensus node is one, the selected consensus node as the abnormal node meeting the set node anomaly condition, or determining, when the number of the at least one consensus node is more than one, one consensus node from the more than one selected consensus nodes based on numbers of proposal generations respectively corresponding to the at least one consensus node, and using the determined consensus node as the abnormal node meeting the set node anomaly condition.

6. The method according to claim 1, further comprising:

resetting numbers of proposal generations respectively corresponding to locally recorded remaining consensus nodes in the distributed system; and resetting the locally recorded total number of proposal generations.

7. The method according to claim 1, wherein the target proposal is obtained in following mode:

the target proposal is generated for target transaction information after a consensus request from a client device for the target transaction information is obtained, when the first consensus node is a master node, or the target proposal is obtained by the master node when the first consensus node is a slave node.

8. The method according to claim 7, wherein the target proposal being obtained by the master node comprises:

a proposal from the master node is used as the target proposal when the proposal from the master node is received within set duration starting from obtaining the consensus request from the client device by the master node, or a null proposal is used as the target proposal when no proposal from the master node is received within the set duration starting from obtaining the consensus request from the client device by the master node.

9. An electronic device, comprising one or more processors and a memory containing a computer program that, when being executed, causes the one or more processors to perform:

selecting, based on numbers of proposal generations corresponding to a plurality of consensus nodes in a distributed system that are locally recorded, an abnormal node meeting a set node anomaly condition from the plurality of consensus nodes in response to a target proposal being obtained and a locally recorded total number of proposal generations reaching a total number threshold;

transmitting a first vote in a prevote stage to other consensus nodes among the plurality of consensus nodes except the first consensus node, and receiving one or more first votes in the prevote stage that are transmitted by the other consensus nodes, the first vote transmitted by a first consensus node, of the plurality consensus nodes, carrying a node identifier of the abnormal node;

transmitting a second vote in a precommit stage to the other consensus nodes, and receiving one or more second votes in the precommit stage that are transmitted by the other consensus nodes, in response to a number of first votes carrying the node identifier of the abnormal node in the received one or more first votes reaching a first vote number threshold, and the second vote transmitted by the first consensus node carrying the node identifier of the abnormal node; and determining that a consensus is reached on the target proposal, and deleting the abnormal node from the plurality of consensus nodes that are locally recorded, in response to a number of second votes carrying the node identifier of the abnormal node in the received one or more second votes reaching a second vote number threshold.

10. The device according to claim 9, wherein the one or more processors are further configured to perform:

accumulating a number of proposal generations corresponding to a master node, and updating the total number of proposal generations, when the plurality of consensus nodes reach a consensus on a non-null proposal generated for the master node during each round of consensus, wherein the master node is one of the plurality of consensus nodes.

11. The device according to claim 10, wherein the first consensus node locally records node proposal mapping information, and the node proposal mapping information comprises: node identifiers of the plurality of consensus nodes and numbers of proposal generations corresponding to the plurality of consensus nodes, the locally recorded total number of proposal generations is determined in a following mode:

the numbers of proposal generations respectively corresponding to the plurality of consensus nodes are obtained from the node proposal mapping information; and the total number of proposal generations is determined based on the obtained numbers of proposal generations respectively corresponding to the plurality of consensus nodes.

12. The device according to claim 9, wherein the one or more processors are further configured to perform:

selecting, from the plurality of consensus nodes, at least one consensus node with a number of proposal generations being less than a proposal generation threshold; and determining one of the at least one consensus node as the abnormal node meeting the set node anomaly condition.

13. The device according to claim 12, wherein the one or more processors are further configured to perform:

using, when a number of the at least one consensus node is one, the selected consensus node as the abnormal node meeting the set node anomaly condition, or determining, when the number of the at least one consensus node is more than one, one consensus node from the more than one selected consensus nodes based on numbers of proposal generations respectively corresponding to the at least one consensus node, and using the determined consensus node as the abnormal node meeting the set node anomaly condition.

14. The device according to claim 9, wherein the one or more processors are further configured to perform:

resetting numbers of proposal generations respectively corresponding to locally recorded remaining consensus nodes in the distributed system; and resetting the locally recorded total number of proposal generations.

15. The device according to claim 9, wherein the target proposal is obtained in following mode:

the target proposal is generated for target transaction information after a consensus request from a client device for the target transaction information is obtained, when the first consensus node is a master node, or the target proposal is obtained by the master node when the first consensus node is a slave node.

16. The device according to claim 15, wherein the target proposal being obtained by the master node comprises:

a proposal from the master node is used as the target proposal when the proposal from the master node is received within set duration starting from obtaining the consensus request from the client device by the master node, or a null proposal is used as the target proposal when no proposal from the master node is received within the set duration starting from obtaining the consensus request from the client device by the master node.

17. A non-transitory computer-readable storage medium containing a computer program that, when being executed, causes at least one processor to perform:

selecting, based on numbers of proposal generations corresponding to a plurality of consensus nodes in a distributed system that are locally recorded, an abnormal node meeting a set node anomaly condition from the plurality of consensus nodes in response to a target proposal being obtained and a locally recorded total number of proposal generations reaching a total number threshold;

transmitting a first vote in a prevote stage to other consensus nodes among the plurality of consensus nodes except the first consensus node, and receiving one or more first votes in the prevote stage that are transmitted by the other consensus nodes, the first vote transmitted by a first consensus node, of the plurality consensus nodes, carrying a node identifier of the abnormal node;

transmitting a second vote in a precommit stage to the other consensus nodes, and receiving one or more second votes in the precommit stage that are transmitted by the other consensus nodes, in response to a number of first votes carrying the node identifier of the abnormal node in the received one or more first votes reaching a first vote number threshold, and the second vote transmitted by the first consensus node carrying the node identifier of the abnormal node; and determining that a consensus is reached on the target proposal, and deleting the abnormal node from the plurality of consensus nodes that are locally recorded, in response to a number of second votes carrying the node identifier of the abnormal node in the received one or more second votes reaching a second vote number threshold.

18. The storage medium according to claim 17, wherein the computer program further causes the at least one processor to perform:

accumulating a number of proposal generations corresponding to a master node, and updating the total number of proposal generations, when the plurality of consensus nodes reach a consensus on a non-null proposal generated for the master node during each round of consensus, wherein the master node is one of the plurality of consensus nodes.

19. The storage medium according to claim 18, wherein the first consensus node locally records node proposal mapping information, and the node proposal mapping information comprises: node identifiers of the plurality of consensus nodes and numbers of proposal generations corresponding to the plurality of consensus nodes, the locally recorded total number of proposal generations is determined in a following mode:

the numbers of proposal generations respectively corresponding to the plurality of consensus nodes are obtained from the node proposal mapping information; and the total number of proposal generations is determined based on the obtained numbers of proposal generations respectively corresponding to the plurality of consensus nodes.

20. The storage medium according to claim 17, wherein the computer program further causes the at least one processor to perform:

selecting, from the plurality of consensus nodes, at least one consensus node with a number of proposal generations being less than a proposal generation threshold; and determining one of the at least one consensus node as the abnormal node meeting the set node anomaly condition.

* * * * *